United States Patent
Nakami

(10) Patent No.: US 7,394,486 B2
(45) Date of Patent: Jul. 1, 2008

(54) ADJUSTING OUTPUT IMAGE OF IMAGE DATA

(75) Inventor: Yoshihiro Nakami, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 504 days.

(21) Appl. No.: 10/525,854

(22) PCT Filed: Sep. 25, 2003

(86) PCT No.: PCT/JP03/12298

§ 371 (c)(1),
(2), (4) Date: Feb. 24, 2005

(87) PCT Pub. No.: WO2004/030373

PCT Pub. Date: Apr. 8, 2004

(65) Prior Publication Data

US 2006/0164518 A1 Jul. 27, 2006

(30) Foreign Application Priority Data

Sep. 26, 2002 (JP) .............................. 2002-281197

(51) Int. Cl.
*H04N 5/228* (2006.01)
(52) U.S. Cl. .................................. 348/222.1
(58) Field of Classification Search .............. 348/222.1, 348/625, 577, 597, 231.99, 207.99, 77; 382/164, 382/274, 266, 125
See application file for complete search history.

(56) References Cited

U.S. PATENT DOCUMENTS 5,130,935 A 7/1992 Takiguchi (Continued)

FOREIGN PATENT DOCUMENTS

EP 0 989 739 3/2000

(Continued)

OTHER PUBLICATIONS

Abstract of Japanese Patent Publication No. 04-266264, Pub. Date: Sep. 22, 1992, Patent Abstracts of Japan.

(Continued)

*Primary Examiner*—Lin Ye
*Assistant Examiner*—Amy Hsu
(74) *Attorney, Agent, or Firm*—Martine Penilla & Gancarella, LLP

(57) ABSTRACT

Using image data generated by an image generating device, and image generation record information that is associated with the image data and that includes at least subject area information indicating a subject area in the image, hue of each pixel in the subject area is calculated, and in the event that the proportion of pixels having hue of a predetermined color range is greater than a first predetermined threshold value, an image quality adjustment process appropriate for an image containing a subject identified by the predetermined color range is executed. In preferred practice, the predetermined color range is the skin color range, and the image quality adjustment process is a process appropriate for a portrait image. When the image quality adjustment process appropriate for a portrait image is not executed, and in the event that the proportion of pixels having hue in the green range is greater than a second predetermined threshold value or in the event that the proportion of pixels having hue in the sky blue range is greater than a third predetermined threshold value, an image quality adjustment process appropriate for a landscape image is executed.

15 Claims, 18 Drawing Sheets

U.S. PATENT DOCUMENTS

| | | | |
|---|---|---|---|
| 5,557,688 A * | 9/1996 | Nakamura | 382/164 |
| 5,697,001 A | 12/1997 | Ring et al. | |
| 6,011,547 A * | 1/2000 | Shiota et al. | 382/254 |
| 6,167,200 A | 12/2000 | Yamaguchi et al. | |
| 6,268,940 B1 | 7/2001 | Saarelma et al. | |
| 6,535,301 B1 | 3/2003 | Kuwata et al. | |
| 6,639,998 B1 * | 10/2003 | Lee et al. | 382/103 |
| 6,704,448 B1 * | 3/2004 | Hasegawa | 382/173 |
| 6,850,271 B1 * | 2/2005 | Ichikawa | 348/207.2 |
| 6,903,782 B2 * | 6/2005 | Herman et al. | 348/625 |
| 7,034,959 B1 * | 4/2006 | Takemoto | 358/1.9 |
| 7,072,074 B2 | 7/2006 | Kuwata et al. | |
| 7,251,054 B2 * | 7/2007 | Takemoto | 358/1.9 |
| 7,292,371 B2 * | 11/2007 | Kuwata et al. | 358/1.9 |
| 2002/0037101 A1 * | 3/2002 | Aihara | 382/167 |
| 2002/0167592 A1 * | 11/2002 | Toyoda et al. | 348/207.1 |
| 2006/0203297 A1 | 9/2006 | Kuwata et al. | |
| 2006/0203298 A1 | 9/2006 | Kuwata et al. | |

FOREIGN PATENT DOCUMENTS

| | | |
|---|---|---|
| EP | 1 087 614 | 3/2001 |
| JP | 04-266264 | 9/1992 |
| JP | 10-191246 | 7/1998 |
| JP | 11-008773 | 1/1999 |
| JP | 11-146219 | 5/1999 |
| JP | 11-220683 | 8/1999 |
| JP | 2000-075351 | 3/2000 |
| JP | 2001-169135 | 6/2001 |
| JP | 2001-186323 | 7/2001 |
| JP | 2001-298631 | 10/2001 |
| JP | 2002-185793 | 6/2002 |

OTHER PUBLICATIONS

Abstract of Japanese Patent Publication No. 11-146219, Pub. Date: May 28, 1999, Patent Abstracts of Japan.

Abstract of Japanese Patent Publication No. 11-220683, Pub. Date: Aug. 10, 1999, Patent Abstracts of Japan.

Abstract of Japanese Patent Publication No. 2001-169135, Pub. Date: Jun. 22, 2001, Patent Abstracts of Japan.

Abstract of Japanese Patent Publication No. 2001-186323, Pub. Date: Jul. 6, 2001, Patent Abstracts of Japan.

Abstract of Japanese Patent Publication No. 2001-298631, Pub. Date: Oct. 26, 2001, Patent Abstracts of Japan.

Abstract of Japanese Patent Publication No. 10-191246, Pub. Date: Jul. 21, 1998, Patent Abstracts of Japan.

Abstract of Japanese Patent Publication No. 11-008773, Pub. Date: Jan. 12, 1999, Patent Abstracts of Japan.

Abstract of Japanese Patent Publication No. 2000-075351, Pub. Date: Mar. 14, 2000, Patent Abstracts of Japan.

* cited by examiner

| Tag name | Parameter value |
|---|---|
| Subject area | • Subject position<br>• Subject area |
| Subject distance | 1 (m) |
| Exposure time | 1/137 sec |
| Aperture value | F8 |
| ISO speed rating | 100 |

⋮ r(Skin) = number of skin color pixels/total number of subject area pixels

If r(Skin) > Th1, process appropriate for portrait scene

Fig.14

| Scene | Standard | Portrait | Landscape |
|---|---|---|---|
| Contrast | standard | weak | high |
| Lightness | standard | light | dark |
| Color balance | standard | standard | standard |
| Saturation | standard | low | high |
| Sharpness | standard | weak | strong |
| Memory color | OFF | skin color | sky blue, green |
| Noise reduction | OFF | OFF | OFF |

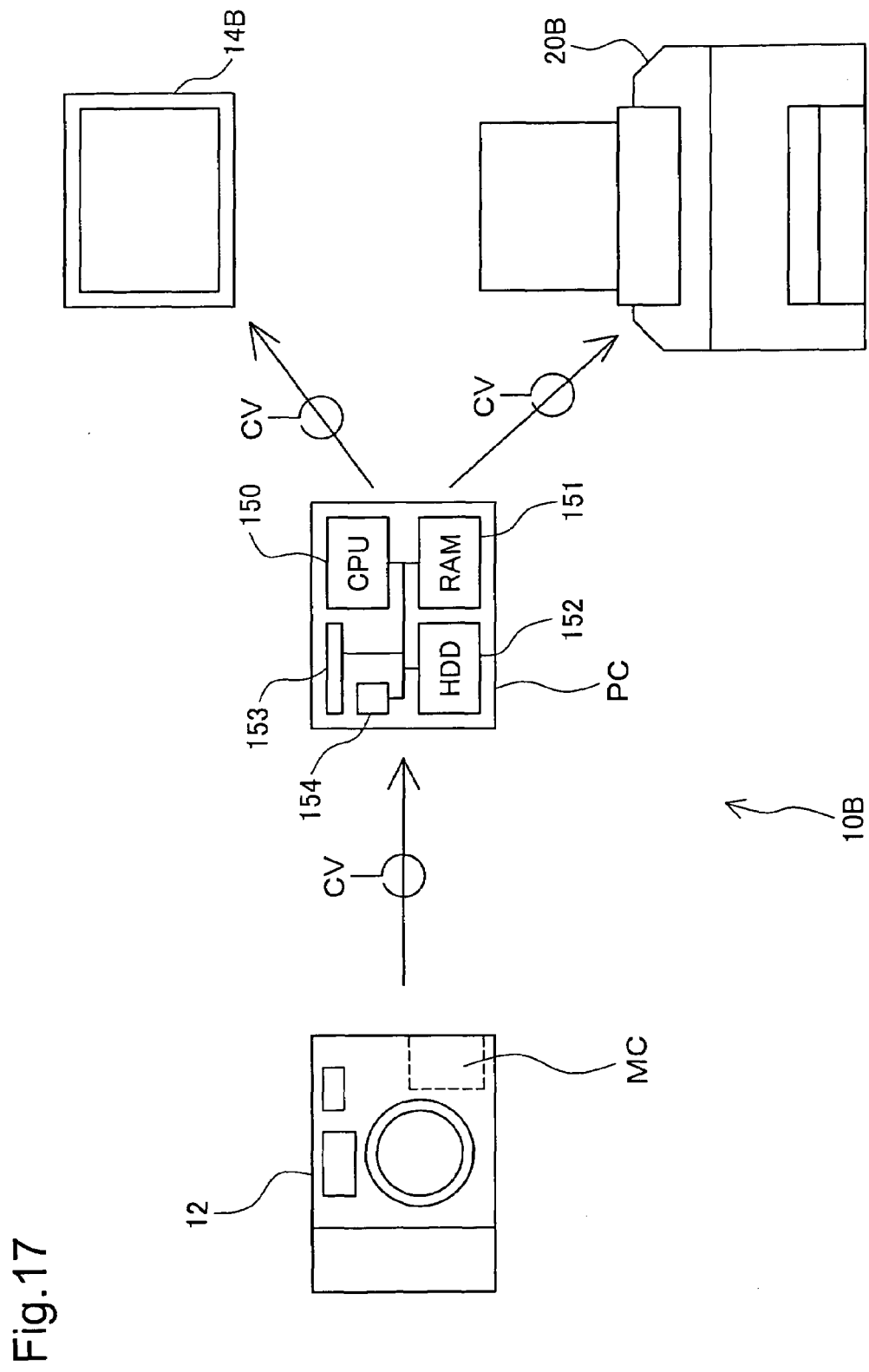

ADJUSTING OUTPUT IMAGE OF IMAGE DATA

TECHNICAL FIELD

The present invention relates to an image adjustment technique for making adjustments to image quality of image data.

BACKGROUND ART

To date, the practice has been that the user selects a shooting scene, such as a portrait or landscape, with a camera or printer driver, and image adjustment appropriate to the particular image is performed according to the scene selection (see, for example, JP11-136219A, JP2001-169135A, and JP2001-298631A).

However, with the prior art techniques, selection of a shooting scene such as a portrait or landscape requires the user to perform a fairly complicated operation during shooting or during printing.

For example, where shooting scene is selected with a camera, where a portrait image and a landscape image are shot in series, it becomes necessary to reset the scene each time an image is taken. Where shooting scene is selected with a printer driver, it becomes necessary to select the shooting scene for each image, which involves a complicated operation in cases where portrait images and landscape images are intermixed.

In view of the problems mentioned above, it is an object of the invention to automatically carry out image quality adjustments appropriate for individual image data.

DISCLOSURE OF THE INVENTION

To address the aforementioned issues at least in part, the output device according to the invention is an output device for outputting an image using image data generated by an image generating device, and image generation record information that is associated with the image data and that includes at least a subject area information indicating a subject area in the image, wherein the output device comprises an image quality adjuster that calculates the hue of each pixel in the subject area, and in the event that the proportion of pixels having hue of a predetermined color range is greater than a first predetermined threshold value, executes an image quality adjustment process appropriate for an image containing a subject identified by the predetermined color range; and an image output unit that outputs an image according to the quality-adjusted image data.

With the output device according to the invention, since the decision as to whether to execute image quality adjustment appropriate for an image containing a subject identified by the predetermined color range is made automatically on the basis of subject area information indicating a subject area in the image, and an image quality adjustment process is carried out according to this decision, image quality adjustment to a particular image data can be carried out automatically.

In preferred practice, in the aforementioned output device, the predetermined color range may be the skin color range, and the image quality adjustment process will be a process appropriate for a portrait image.

With this arrangement, the decision as to whether to execute image quality adjustment appropriate for a portrait image can be made automatically on the basis of subject area information indicating a subject area in the image, and an image quality adjustment process carried out according to this decision.

It is possible to execute the image quality adjustment process appropriate for a portrait image, exclusively on a partial area that includes the subject area.

It is possible to execute image quality adjustment exclusively on a target processing area which is a portion within the image, the target processing area containing pixels present within the subject area and having color of the predetermined color range. The target processing area may include pixels of a first type present within the subject area and having color of the predetermined color range, and pixels of second type present outside the subject area, but contiguous with pixels of a first type and having color of the predetermined color range.

In preferred practice, in the aforementioned output device, when an image quality adjustment process appropriate for a portrait image is not executed, the image quality adjuster may execute an image quality adjustment process appropriate for a landscape image, in the event that the proportion of pixels having hue in the green range is greater than a second predetermined threshold value, or the proportion of pixels having hue in the sky blue range is greater than a third predetermined threshold value.

With this arrangement, in the event that image quality adjustment appropriate for a portrait image is not executed, a decision as to whether to execute an image quality adjustment process appropriate for a landscape image can be made automatically on the basis of subject area information indicating a subject area in the image, and image quality adjustment processing carried out according to this decision.

The invention may be realized in various embodiments, for example, an image output method and image output device; an image data processing method and image data processing device; a computer program for implementing functions of such a method or device; and a storage medium having such a computer program stored thereon.

BRIEF DESCRIPTION OF THE DRAWINGS

FIG. 14 is an explanatory diagram showing the specifics of a process appropriate for a shooting scene in a embodiment of an automatic image quality adjustment process.

FIG. 17 is an explanatory diagram showing an exemplary image output system in which an image data processing may be implemented.

BEST MODE FOR CARRYING OUT THE INVENTION

Output image adjustment of image files according to the present invention is described hereinbelow through several embodiments, in the following order, with reference to the accompanying drawings.

Figure 1:
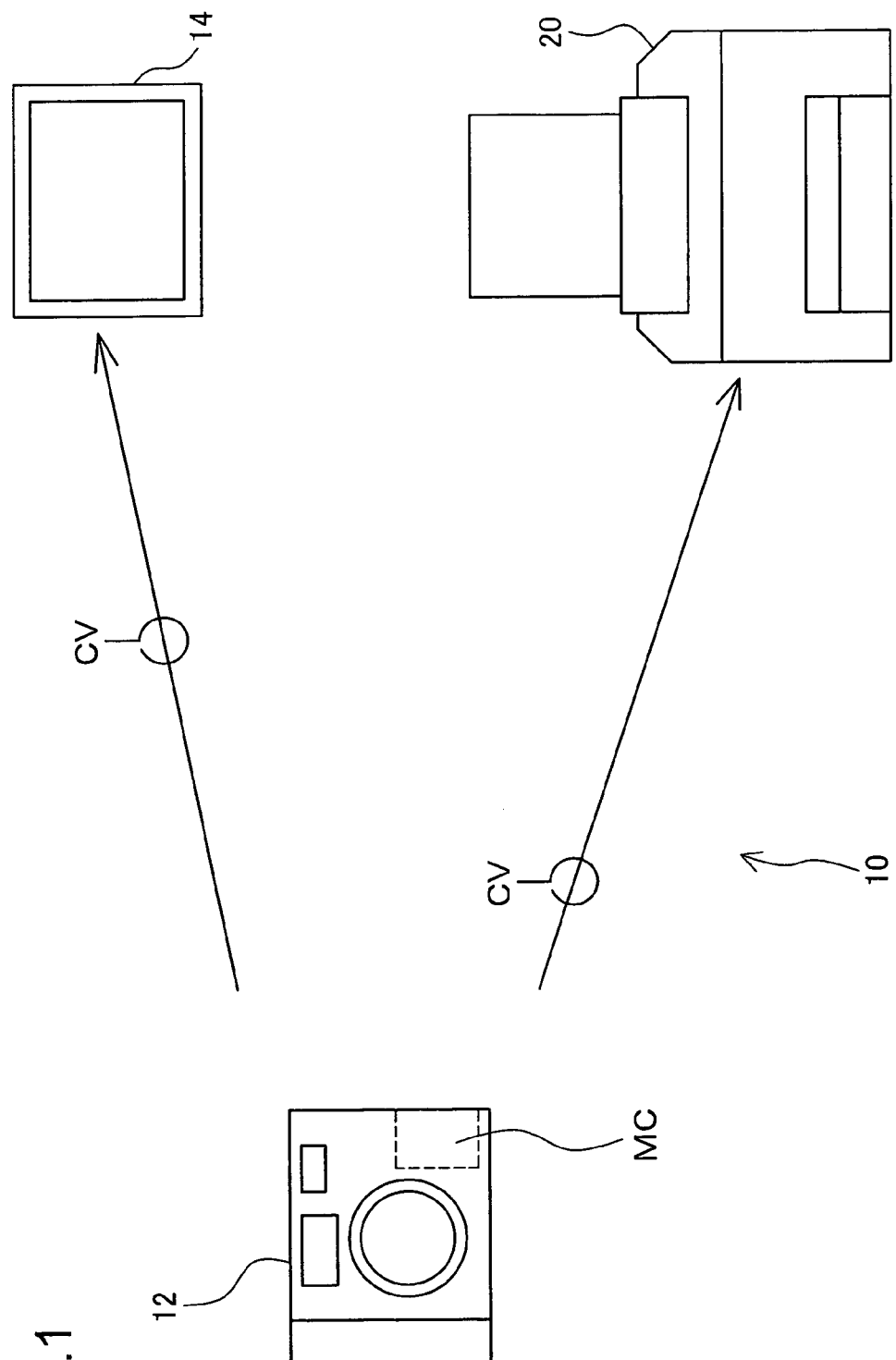
FIG. 1 is a block diagram showing the arrangement of an image output system as a embodiment of the invention.

A. Arrangement of Image Output System
B. Arrangement of Image File
C. Arrangement of Image Output System Capable of Using Image File
D. Image Processing in Digital Still Camera
E. Image Processing in Printer
F. Embodiment of Automatic Image Quality Adjustment Process
G. Arrangement of Image Output System Employing Image Data Processing Device
H. Variations A. Arrangement of Image Output System FIG. 1 illustrates an exemplary image output system in which an output device may be implemented as a embodiment of the invention. Image output system 10 comprises a digital still camera 12 as an image generating device for generating image files; and a printer 20 as an image output device. An image file generated by digital still camera 12 may be transferred to printer 20 via a cable CV, or by directly inserting into printer 20 a memory card MC on which the image file is stored. Printer 20 executes image quality adjustment processing of image data based on the image file that has been read in, and outputs an image. As the output device, a CRT display, LCD display, or other monitor 14, a projector, or the like may be used in addition to or instead of a printer 20. The following description is based on the use of a printer 20 as the output device comprising an image quality adjuster and an image output unit, with a memory card MC being inserted directly into the printer 20.

Figure 2:
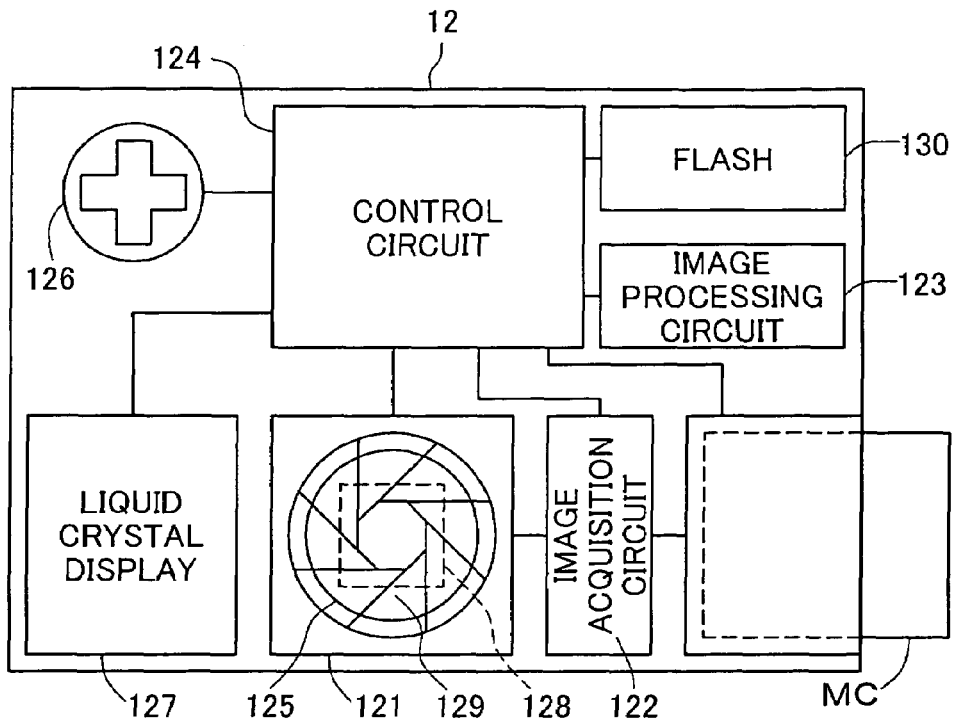
FIG. 2 is a block diagram showing a simplified arrangement of a digital still camera 12.

FIG. 2 is a block diagram showing a simplified arrangement of digital still camera 12. The digital still camera 12 of this embodiment comprises an optical circuit 121 for collecting optical information; an image acquisition circuit 122 for controlling the optical circuit to acquire an image; an image processing circuit 123 for processing the acquired digital image; a flash 130 serving as a supplemental light source; and a control circuit 124 for controlling the various circuits. Control circuit 124 comprises memory, not shown. Optical circuit 121 comprises a lens 125 for collecting optical information; an aperture 129 for adjusting the amount of light; and a CCD 128 for converting optical data passing through the lens into image data.

Digital still camera 12 stores the acquired image on a memory card MC. The typical storage format for image data in digital still camera 12 is the JPEG format, but other storage formats, such as TIFF format, GIF format, BMP format, or RAW data format may be used instead.

Digital still camera 12 comprises a Select/Set button 126 for setting various shooting parameters; and a liquid crystal display 127. Liquid crystal display 127 is used to preview a shot image, and when setting the aperture or other parameters using the Select/Set button 126.

Once a shot has been taken by digital still camera 12, image data and image generation record information are stored in the form of an image file on memory card MC. Image generation record information may include aperture value and other parameter settings at the time of shooting (time of generation of image data) as described in detail hereinbelow.

B. Arrangement of Image File

Figure 3:
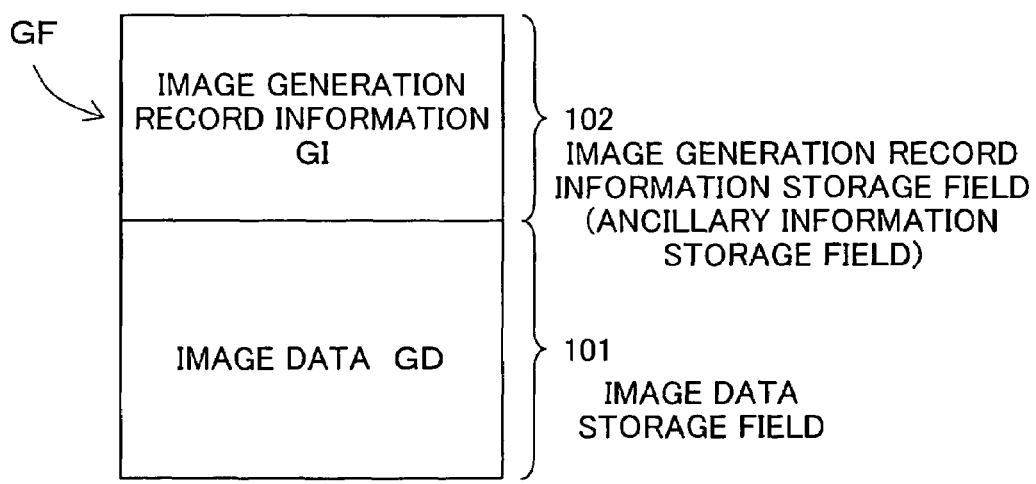
FIG. 3 is an explanatory diagram conceptually illustrating an example of an arrangement within an image file that can be used in this embodiment.

FIG. 3 is an explanatory diagram conceptually illustrating an example of an arrangement within an image file that may be used in this embodiment. Image file GF comprises an image data storage field 101 for storing image data GD; and an image generation record information storage field 102 for storing image generation record information GI. Image data GD is stored, for example, in JPEG format, while image generation record information GI is stored, for example, in TIFF format (a format in which data and data fields are identified by tags). The terms file structure and data structure in this embodiment refer to the structure of the file or data in the form in which the file or data etc. is stored in a memory device.

Image generation record information GI is information relating to an image when image data is generated or shot by digital still camera 12 or other such image generating device, and includes settings such as the following.

Subject distance
Subject distance range
Subject area
Exposure time
Aperture value
ISO speed rating (ISO speed)
Shooting mode
Maker name
Model name
Gamma value The image file GF of this embodiment may basically comprise the aforementioned image data storage field 101 and image generation record information storage field 102; or may have a file structure according to an existing standardized file format. The following specific description pertains to the case where the image file GF pertaining to this embodiment conforms to the Exif file format.

An Exif file has a file structure in accordance with the digital still cameran image file format specification (Exif); the specification has been proposed by the Japan Electronics and Information Technology Industries Association (JEITA). Similar to the conceptual diagram in FIG. 3, the Exif file format comprises a JPEG image data storage field for storing image data in the JPEG format; and an ancillary information storage field for storing information of various kinds relating to stored JPEG image data. The JPEG image data storage field corresponds to the image data storage field 101 in FIG. 3, and the ancillary information storage field to the image generation record information storage field 102. The ancillary information storage field stores image generation record information relating to a JPEG image, such as shooting date/time, aperture value, and subject distance.

Figure 4:
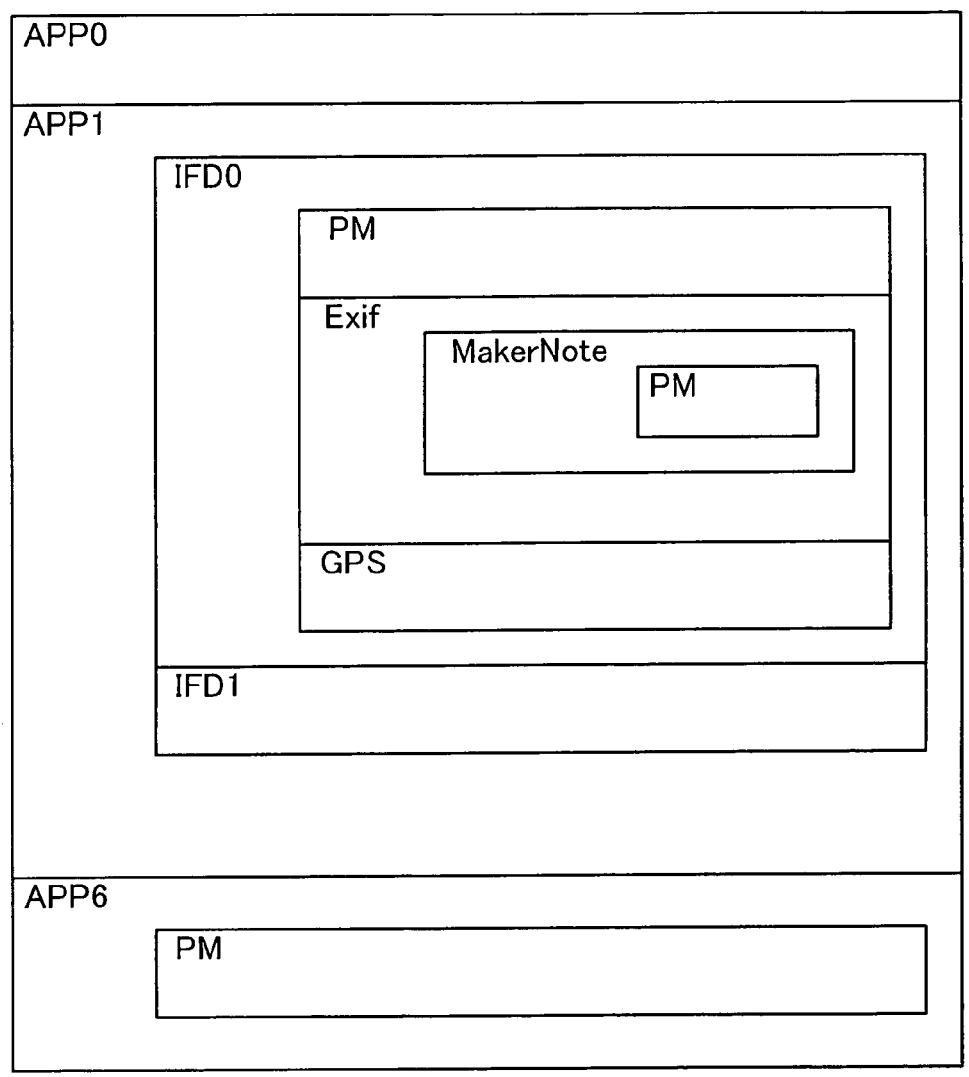
FIG. 4 is an explanatory diagram describing an example of data structure of an ancillary information storage field 103.

FIG. 4 is an explanatory diagram describing an example of data structure of ancillary information storage field 103. In the Exif file format, hierarchical tags are used to designate data fields. Each data field contains within it a plurality of subordinate data fields identified by subordinate tags. In FIG. 4, areas enclosed by rectangles represent single data fields, with tag names noted at upper left. In this embodiment, three data fields whose tag names are APP0, APP1, and APP6 are contained. The APP1 data field contains within it two data fields with the tag names IFD0 and IFD1. The IFD0 data field contains three data fields with the tag names PM, Exif, and GPS. Data and data fields are stored according to a prescribed address or offset value; address or offset value can be searched by means of tag name. In the output device, data corresponding to desired information is acquired by means of specifying and address or offset value corresponding to the desired information.

Figures 5, 6:
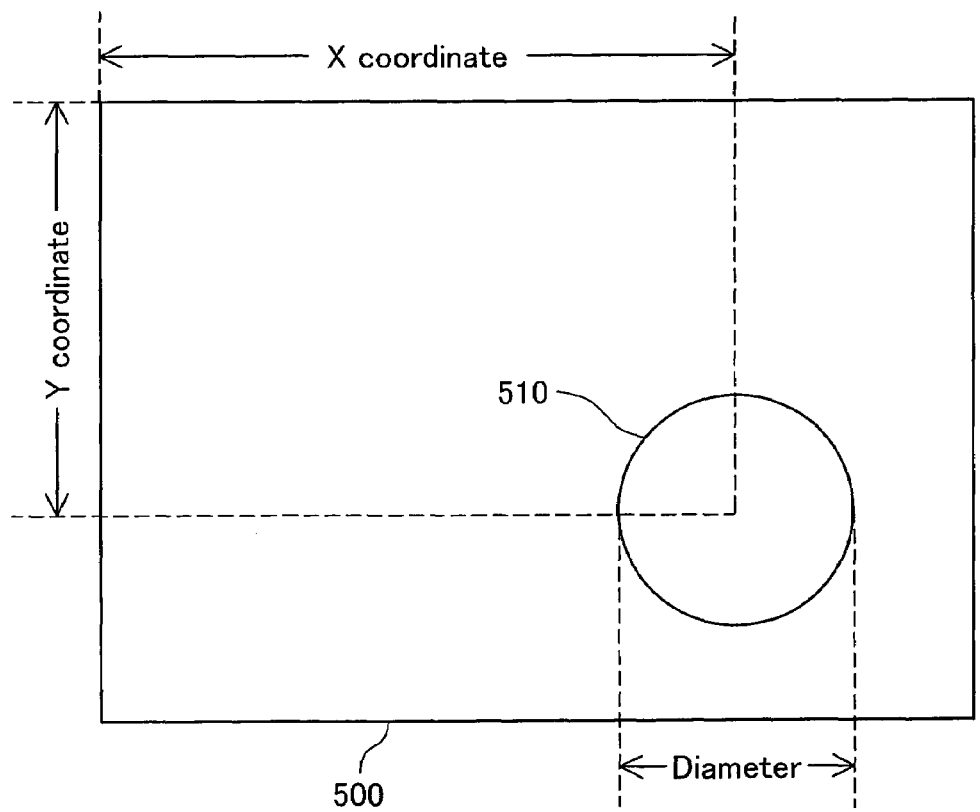
FIG. 5 is an explanatory diagram describing an example of data structure in an Exif data field.
FIG. 6 is an explanatory diagram showing a subject area 510 in an image 500.

FIG. 5 is an explanatory diagram describing an example of data structure (data tag names and parameter values) in the Exif data field in FIG. 4, wherein tag names are referenced by tracing in the order APP1-IFD0-Exif. As shown in FIG. 4, the Exif data field may include a data field with the tag name MakerNote; the MakerNote data field may in turn include a plurality of items of data, although these are omitted in FIG. 5.

As shown in FIG. 5, the Exif data field stores parameter values relating to information such as subject area, subject distance, exposure time, aperture value, and ISO speed rate, etc. In this embodiment, subject area can be used as information indicating the area of a subject.

FIG. 6 shows a subject area 510 in an image 500. As shown in the drawing, the subject area is represented by center coordinates with the upper left of the image as the origin, and the diameter of the area. The subject area may be rectangular in shape, in which case the area range will be represented in terms of height and width.

Information associated with image data may also be stored appropriately in fields other than the Exif data field in FIG. 4. For example, maker name and model name are stored in the data field with the tag name IFD0, as information identifying the image generating device.

C. Arrangement of Image Output Device

Figure 7:
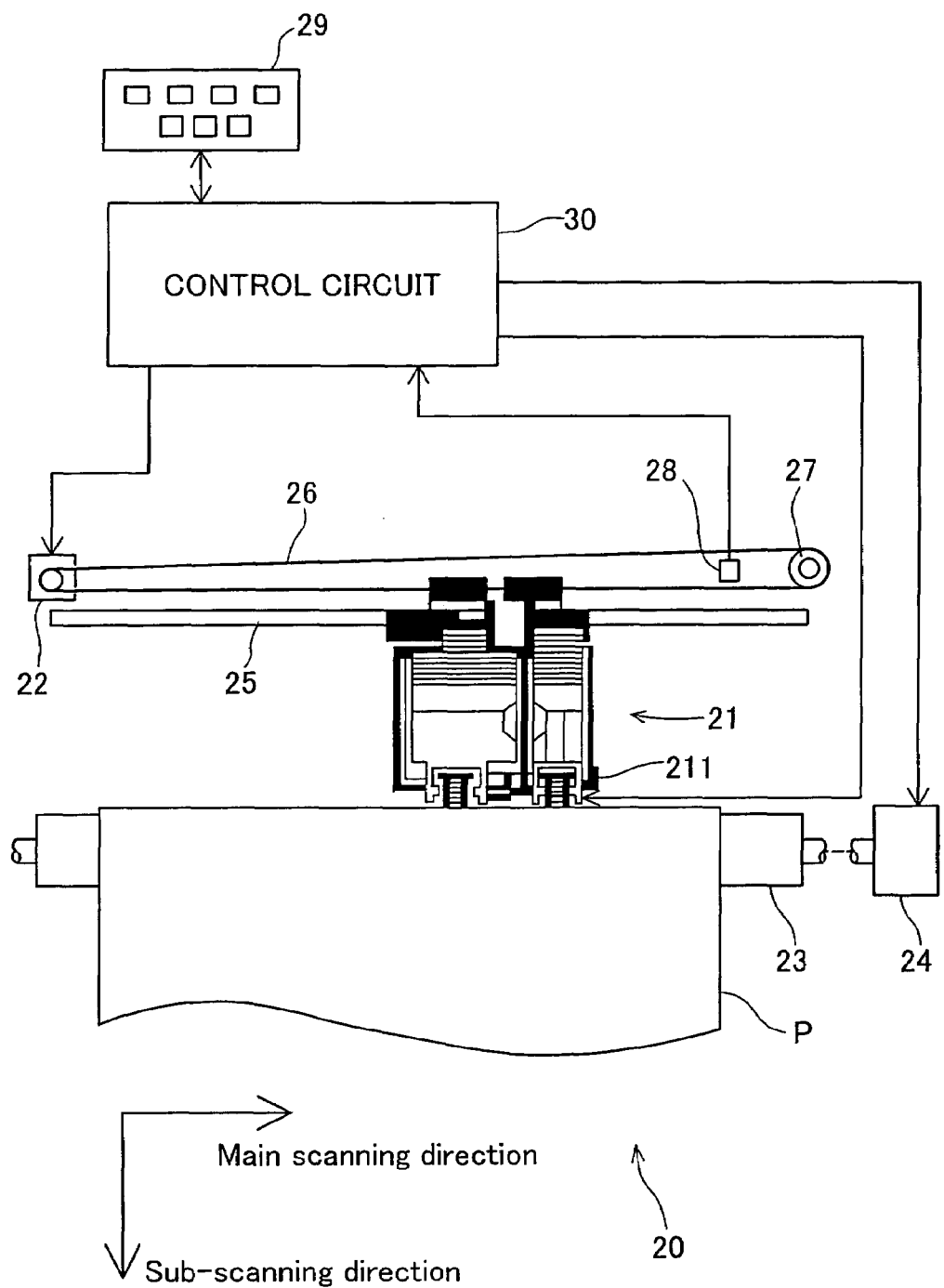
FIG. 7 is a block diagram showing a simplified arrangement of a printer 20.

FIG. 7 is a block diagram showing a simplified arrangement of printer 20 in the embodiment. Printer 20 is a printer capable of image output, for example, an ink jet printer that ejects ink of four colors, cyan C, magenta Mg, yellow Y, and black K, on a print medium to produce a dot pattern. An electrophotographic printer that transfers and fixes toner onto a print medium may also be used. In addition to the four colors indicated above, light cyan LC which is lighter in density than cyan C, light magenta LM which is lighter in density than magenta Mg, and dark yellow DY which is darker in density than yellow Y, may be used as inks. The arrangement may employ black K only where monochromatic printing is performed; or red R or green G may be used. The type of ink or toner used may be selected depending on the characteristics of the image for output.

As shown in the drawing, printer 20 comprises a mechanism for driving a print head 211 mounted on a carriage 21, to eject ink and form dots; a mechanism for reciprocating carriage 21 in the axial direction of a platen 23; a mechanism for feeding printer paper P by means of a paper feed motor 24; and a control circuit 30. By means of these mechanisms, printer 20 functions as an image output unit. The mechanism for reciprocating carriage 21 in the axial direction of the platen 23 is composed of a slide rail 25 extending parallel to the axis of platen 23, for slidably retaining carriage 21; a pulley 27 linked via an endless drive belt 26 to a carriage motor 22; and a position sensor 28 for sensing the home position of carriage 21. The mechanism for feeding printer paper P is composed of platen 23; paper feed motor 24 which rotates platen 23; an auxiliary paper feed roller, not shown in the drawing; and a gear train (not shown) for transmitting rotation of paper feed motor 24 to platen 23 and the auxiliary paper feed roller.

Control circuit 30 exchanges signals with a printer control panel 29 while appropriately controlling operation of paper feed motor 24, carriage motor 22, and print head 211. Printer paper P supplied to printer 20 is set between platen 23 and the auxiliary paper feed roller, and advanced by a predetermined amount depending on the rotation angle of platen 23.

Carriage 21 has a print head 211, and enables mounting of an ink jet cartridge of utilizable inks. On the bottom face of print head 211 are disposed nozzles for ejecting utilizable inks (not shown).

Figure 8:
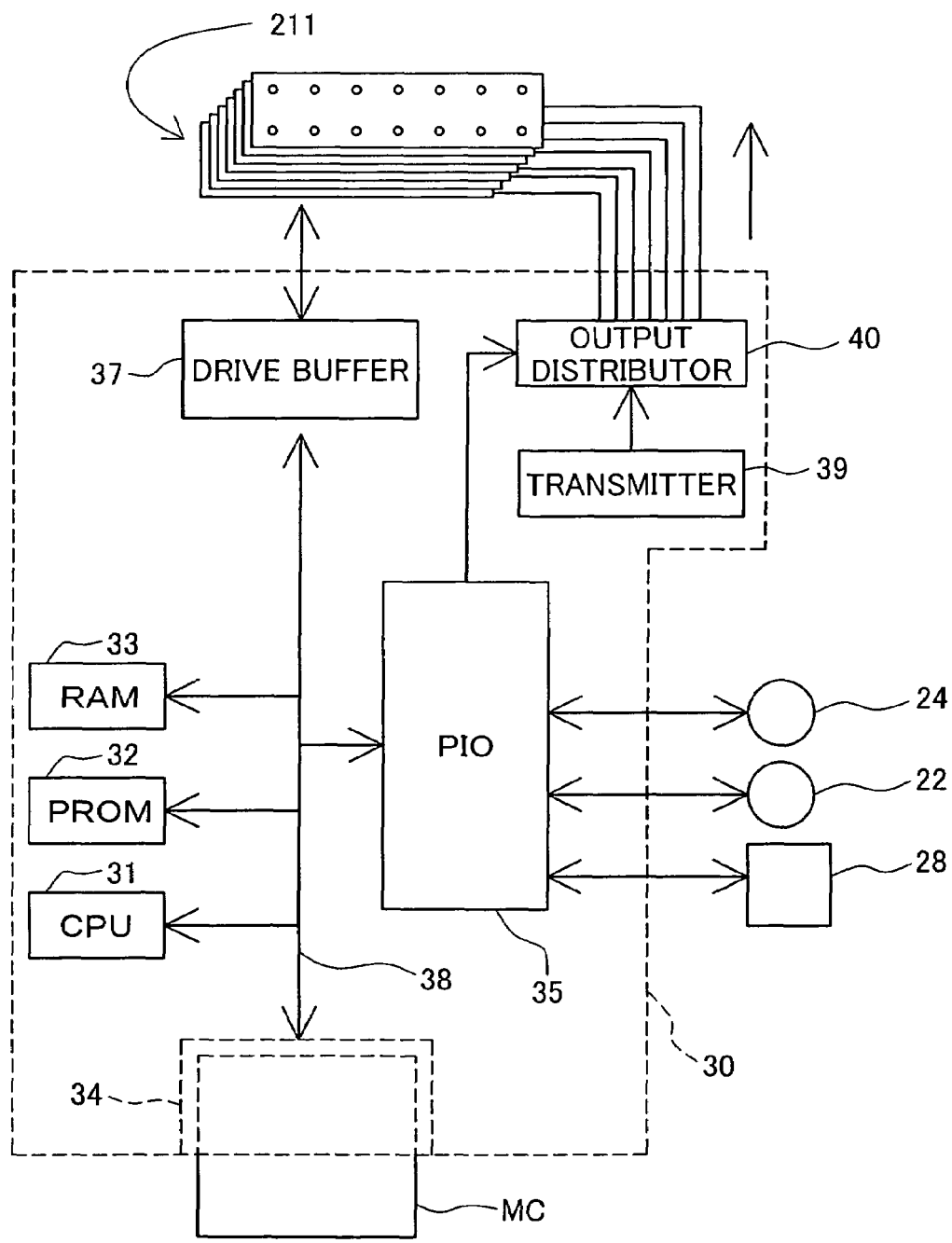
FIG. 8 is a block diagram showing an arrangement of printer 20, centered on the control circuit 30 of printer 20.

FIG. 8 is a block diagram showing an arrangement of printer 20, centered on the control circuit 30 of printer 20. Within control circuit 30 are disposed a CPU 31, PROM 32, RAM 33, a memory card slot 34 for acquiring data from a memory card MC, a peripheral device input/output unit (PIO) 35 for exchanging data with paper feed motor 24, carriage motor 22, etc., a drive buffer 37, and the like. Drive buffer 37 is used as a buffer for supplying dot on/off signals to print head 211. These components are interconnected to a bus 38, enabling exchange of data among them. Control circuit 30 is also provided with a transmitter 39 for outputting a drive waveform at predetermined frequency, and a distributed output device 40 for distributing the output of transmitter 39 to print head 211 at predetermined timing.

Control circuit 30, while synchronizing with operations of paper feed motor 24 and carriage motor 22, outputs dot data to drive buffer 37 at predetermined timing. Control circuit 30 also reads an image file from memory card MC, analyzes the ancillary information, and performs image processing based on the image generation record information acquired thereby. That is, control circuit 30 functions as the image quality adjuster. The process flow of image processing executed by control circuit 30 will be described in detail hereinafter.

D. Image Processing in Digital Still Camera

Figure 9:
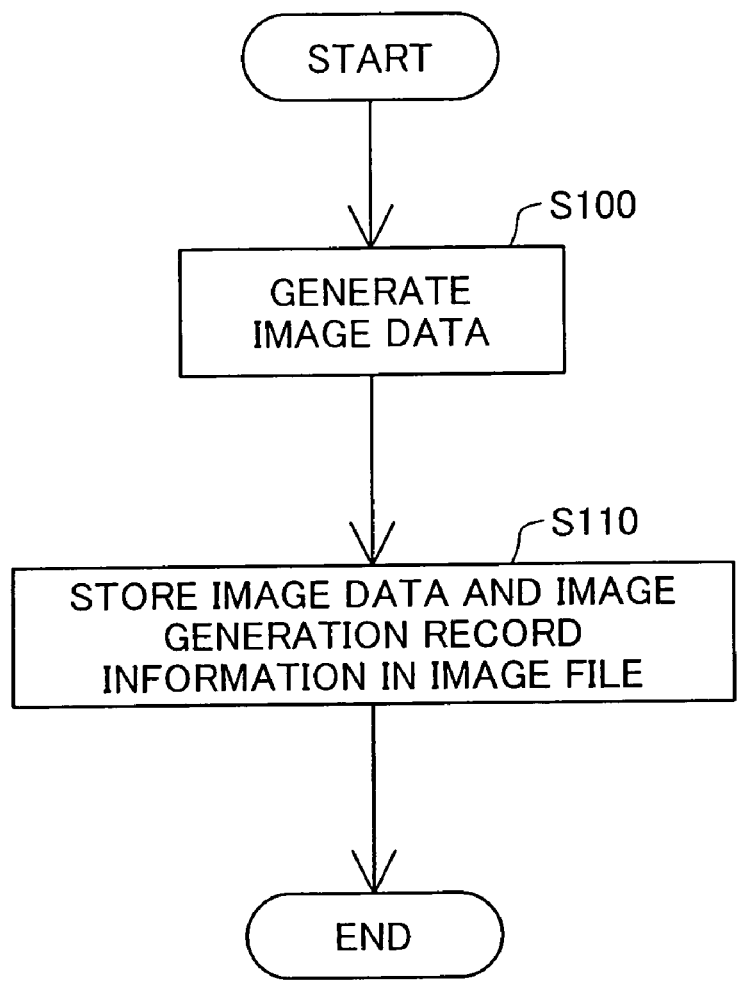
FIG. 9 is a flowchart showing a process flow for generating an image file GF in a digital still camera 12.

FIG. 9 is a flowchart showing process flow for generating an image file GF in digital still camera 12.

Control circuit 124 (FIG. 2) of digital still camera 12 generates image data GD in response to a shoot request, for example, depression of the shutter button (Step S100). Where aperture value, ISO speed, shooting mode and other parameter settings have been made, the set parameter values are used when generating the image data GD.

Control circuit 124 stores the generated image data GD and image generation record information GI as an image file GF on memory card MC (Step S110), and terminates the processing routine. Image generation record information GI includes parameters used at the time of image generation, such as aperture value, ISO speed, etc.; shooting mode and/or other arbitrarily set parameter values; and parameter values set automatically, such as maker name, model name, and the like. Image data GD is stored in image file GF after being converted from the RGB color space to the YCbCr color space, and compressed in JPEG format.

By means of the aforementioned processes executed in digital still camera 12, both image data GD and image generation record information GI that includes various parameter values at the time of generation of image data, are established in an image file GF for storage on memory card MC.

E. Image Processing in Printer

Figure 10:
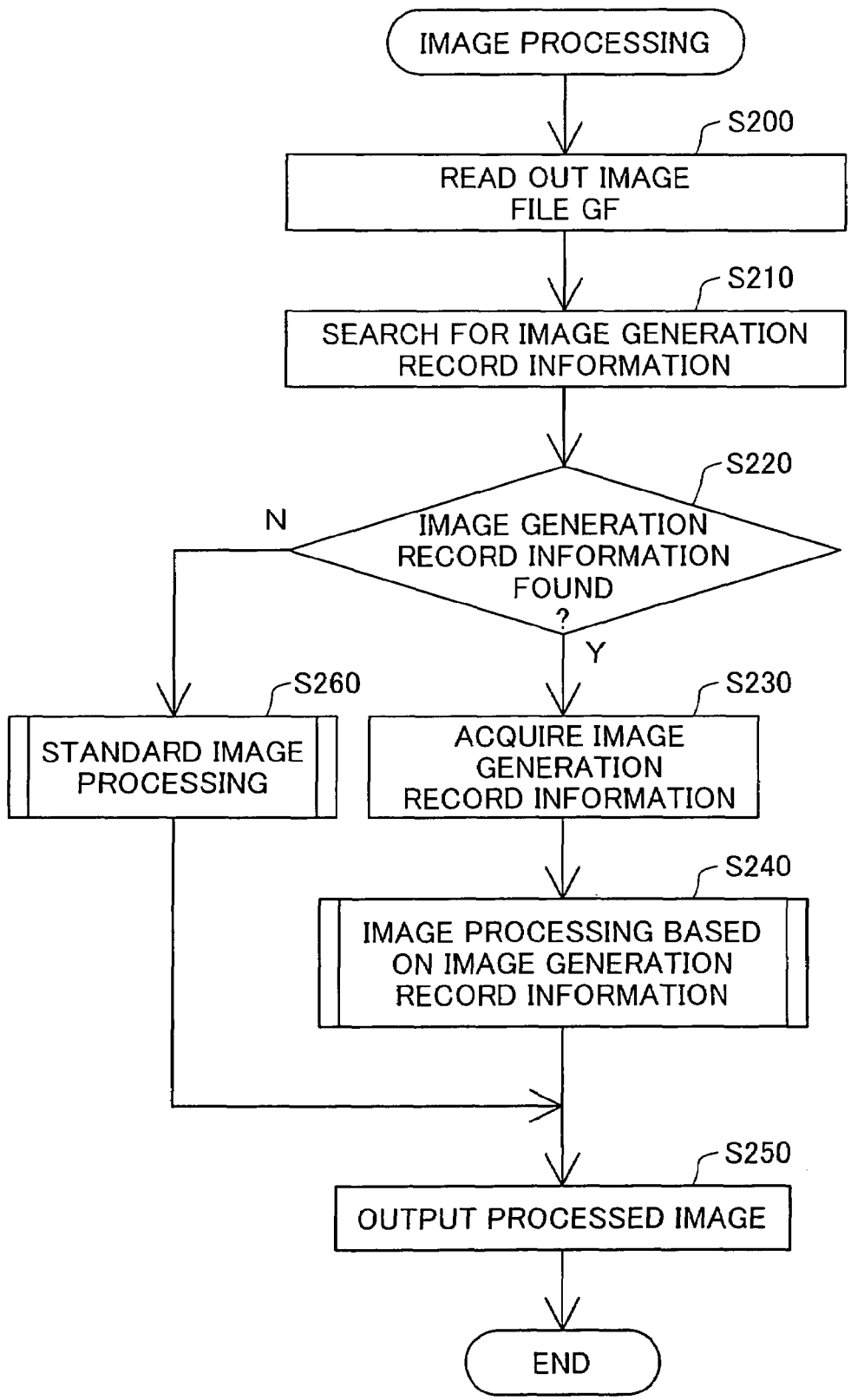
FIG. 10 is a flowchart showing a processing routine for image processing in printer 20.

FIG. 10 is a flowchart showing a processing routine for image processing in printer 20 of the embodiment. The following description is based on a scenario wherein a memory card MC having an image file GF stored thereon is inserted directly into printer 20. When memory card MC has been inserted into memory card slot 34, the CPU 31 of control circuit 30 (FIG. 8) of printer 20 reads out the image file GF from memory card MC (Step S200). Next, in Step S210, CPU 31 searches in the ancillary information storage field of image file GF for image generation record information GI indicating information at the time that the image data was generated. In the event that image generation record information GI is found (Step S220: Y), CPU 31 acquires and analyzes the image generation record information GI (Step S230). On the basis of the analyzed image generation record information GI, CPU 31 executes image processing, described hereinbelow (Step S240), outputs the processed image (Step S250), and terminates the processing routine.

An image file created by a drawing application program or the like, on the other hand, will not have image generation record information GI that contains information such as aperture value and the like. If CPU 31 does not find image generation record information GI (Step S200: N), it performs standard processing (Step S260), outputs the processed image (Step S250), and terminates the processing routine.

Figure 11:
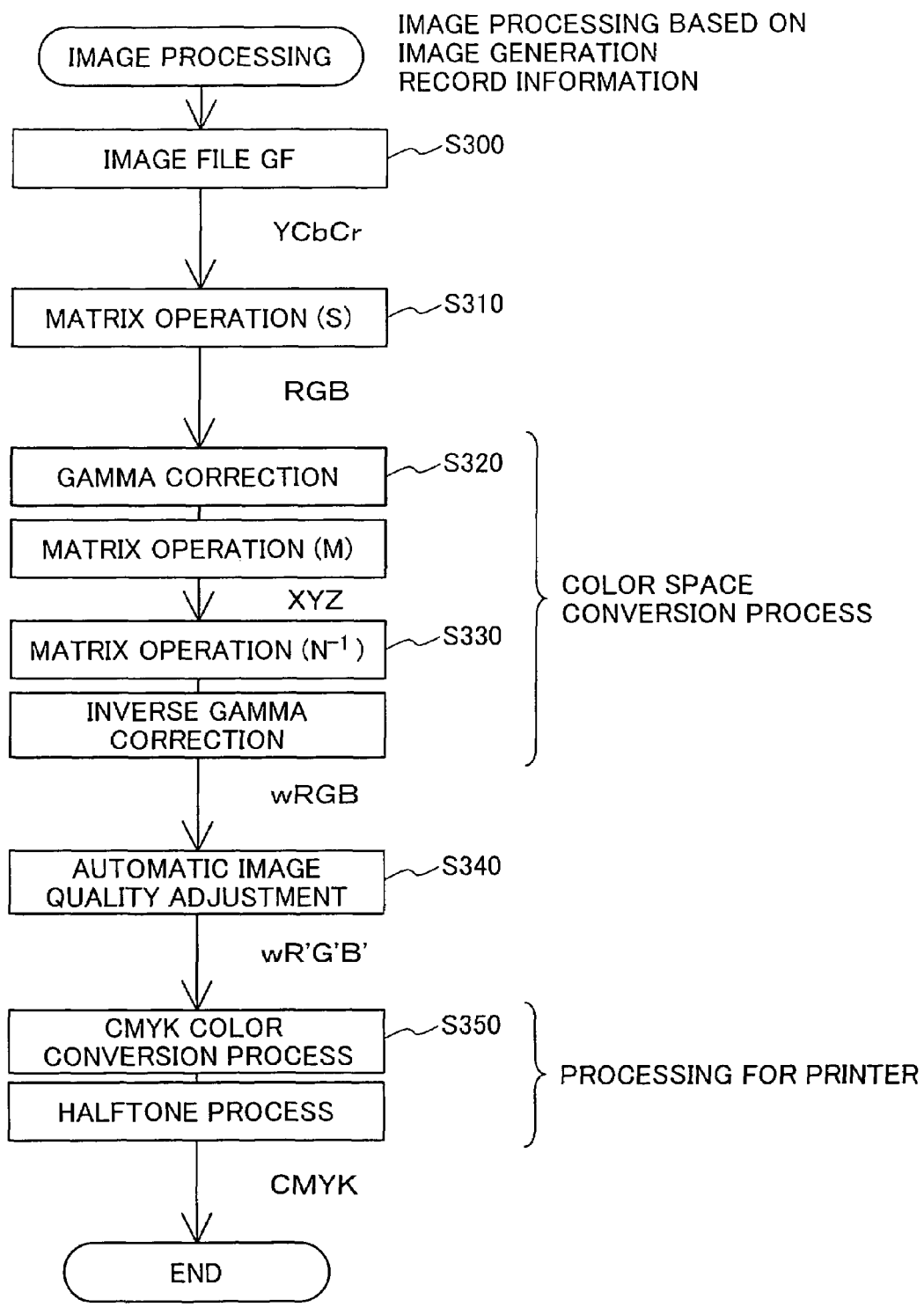
FIG. 11 is a flowchart showing a processing routine for image processing based on image generation record information.

FIG. 11 is a flowchart showing a processing routine for image processing (corresponding to Step S240 in FIG. 10) based on image generation record information. The CPU 31 of control circuit 30 (FIG. 8) of printer 20 reads out image data GD from the read out image file GF (Step S300)

As mentioned previously, digital still camera 12 stores image data GD as JPEG format files, and in a JPEG format file image data is stored using an YCbCr color space. In Step S310, CPU 31 executes an operation using 3×3 matrix S to convert image data based on an YCbCr color space into image data based on an RGB color space. This matrix operation is represented by the following arithmetic expression, for example.

$$\begin{pmatrix} R \\ G \\ B \end{pmatrix} = S \begin{pmatrix} Y \\ Cb - 128 \\ Cr - 128 \end{pmatrix} \quad [\text{Eq. 1}]$$

$$S = \begin{pmatrix} 1 & 0 & 1.40200 \\ 1 & -0.34414 & -0.71414 \\ 1 & 1.77200 & 0 \end{pmatrix}$$

Where the color space of image data generated by digital still camera 12 is wider than a predetermined color space, for example, the sRGB color space, image data based on the RGB color space obtained in Step S310 may in some instances contain useful data that is outside the defined area of the RGB color space. Where image generation record information GI instructs this out-of-defined area data to be handled as valid data, the out-of-defined area data will be kept as-is, while continuing with subsequent image processing. In the absence of an instruction to handle out-of-defined area data as valid data, out-of-defined area data is clipped to the defined area. For example, where the defined area is 0-255, negative value data of less than 0 is rounded to 0, and data above 256 to 255. In the event that the color space that is reproducible by the image output unit is not wider than a predetermined color space, for example, the sRGB color space, it is preferable to perform clipping to the defined area regardless of any instruction in the image generation record information GI. Such instances may include, for example, cases where the image is output to a CRT, whose reproducible color space is the sRGB color space.

Next, in Step S320, CPU 31 performs gamma correction and an operation employing a matrix M, to convert image data based on an RGB color space to image data based on an XYZ color space. Image file GF may contain gamma value and color space information at the time of image generation. In the event that image generation record information GI includes this information, CPU 31 acquires the gamma value of the image data from the image generation record information GI, and executes a gamma conversion process of the image data using the acquired gamma value. CPU 31 then acquires color space information for the image data from the image generation record information GI, and executes a matrix operation of the image data using a matrix M that corresponds to the color space. In the event that image generation record information GI does not contain a gamma value, a gamma conversion process can be executed using a standard gamma value. In the event that image generation record information GI does not contain color space information, matrix operations may be executed using a standard matrix M. A gamma value and matrix for the sRGB color space may be used respectively as this standard gamma value and matrix M. The matrix operation may be given by the following arithmetic expression, for example.

$$\begin{pmatrix} X \\ Y \\ Z \end{pmatrix} = M \begin{pmatrix} Rt' \\ Gt' \\ Bt' \end{pmatrix} \quad [\text{Eq. 2}]$$

$$M = \begin{pmatrix} 0.6067 & 0.1736 & 0.2001 \\ 0.2988 & 0.5868 & 0.1144 \\ 0 & 0.0661 & 1.1150 \end{pmatrix}$$

$$Rt, Gt, Bt \geq 0$$

$$Rt' = \left(\frac{Rt}{255}\right)^\gamma \quad Gt' = \left(\frac{Gt}{255}\right)^\gamma \quad Bt' = \left(\frac{Bt}{255}\right)^\gamma$$

$$Rt, Gt, Bt < 0$$

$$Rt' = -\left(\frac{-Rt}{255}\right)^\gamma \quad Gt' = -\left(\frac{-Gt}{255}\right)^\gamma \quad Bt' = -\left(\frac{-Bt}{255}\right)^\gamma$$

The color space of image data obtained after the matrix operation has been executed is an XYZ color space. The XYZ color space is an absolute color space, and is a device-independent color space not dependent on a device such as a digital still camera or printer. Thus, device-independent color matching may be carried out by means of color space conversion to the XYZ color space.

Next, in Step S330, CPU 31 performs an operation employing a matrix $N^{-1}$, and inverse gamma correction to convert image data based on the XYZ color space to image data based on the wRGB color space. During inverse gamma correction, CPU 31 acquires a printer-side gamma value from PROM 32, and executes inverse gamma correction of the image data using the inverse of the acquired gamma value. CPU 31 then acquires from PROM 32 a matrix $N^{-1}$ that corresponds to the conversion from the XYZ color space to the wRGB color space, and performs a matrix operation on the image data using this matrix $N^{-1}$. This matrix operation may be given by the following arithmetic expression, for example.

$$\begin{pmatrix} Rw \\ Gw \\ Bw \end{pmatrix} = N^{-1} \begin{pmatrix} X \\ Y \\ Z \end{pmatrix} \quad \text{[Eq. 3]}$$

$$N^{-1} = \begin{pmatrix} 3.30572 & -1.77561 & 0.73649 \\ -1.04911 & 2.1694 & -1.4797 \\ 0.06568289 & -0.241078 & 1.24898 \end{pmatrix}$$

$$Rw' = \left(\frac{Rw}{255}\right)^{1/\gamma} \quad Gw' = \left(\frac{Gw}{255}\right)^{1/\gamma} \quad Bw' = \left(\frac{Bw}{255}\right)^{1/\gamma}$$

Next, in Step S340, CPU 31 executes automatic adjustment processing of image quality. Automatic image quality adjustment processing in the embodiment involves automatic image quality adjustment processing of image data using image generation record information (subject area information) contained in the image file GF. Automatic image quality adjustment processing is described hereinbelow.

Next, in Step S350, CPU 31 executes a CMYK color conversion process and a halftone process for the purpose of printing. In the CMYK color conversion process, CPU 31 refers to a look-up table (LUT), stored in PROM 32, for conversion from the wRGB color space to the CMYK color space, and converts the color space of the image data from the wRGB color space to the CMYK color space. That is, image data consisting of RGB tone level values is converted to image data for use by printer 20, consisting, for example, of tone level values for six colors, C (Cyan), M (Magenta), Y (Yellow), K (Black), LC (Light Cyan), and LM (Light Magenta).

In the halftone process, CPU 31 executes a so-called halftone process to produce halftone image data from the color-converted image data. This halftone image data is sequenced in the order of transmission to drive buffer 37 (FIG. 8) to produce final print data, whereupon the processing routine terminates. Image data processed by means of this processing routine is output in Step S250 of the image processing routine shown in FIG. 10.

F. Embodiment of Automatic Image Quality Adjustment Process

Figure 12:
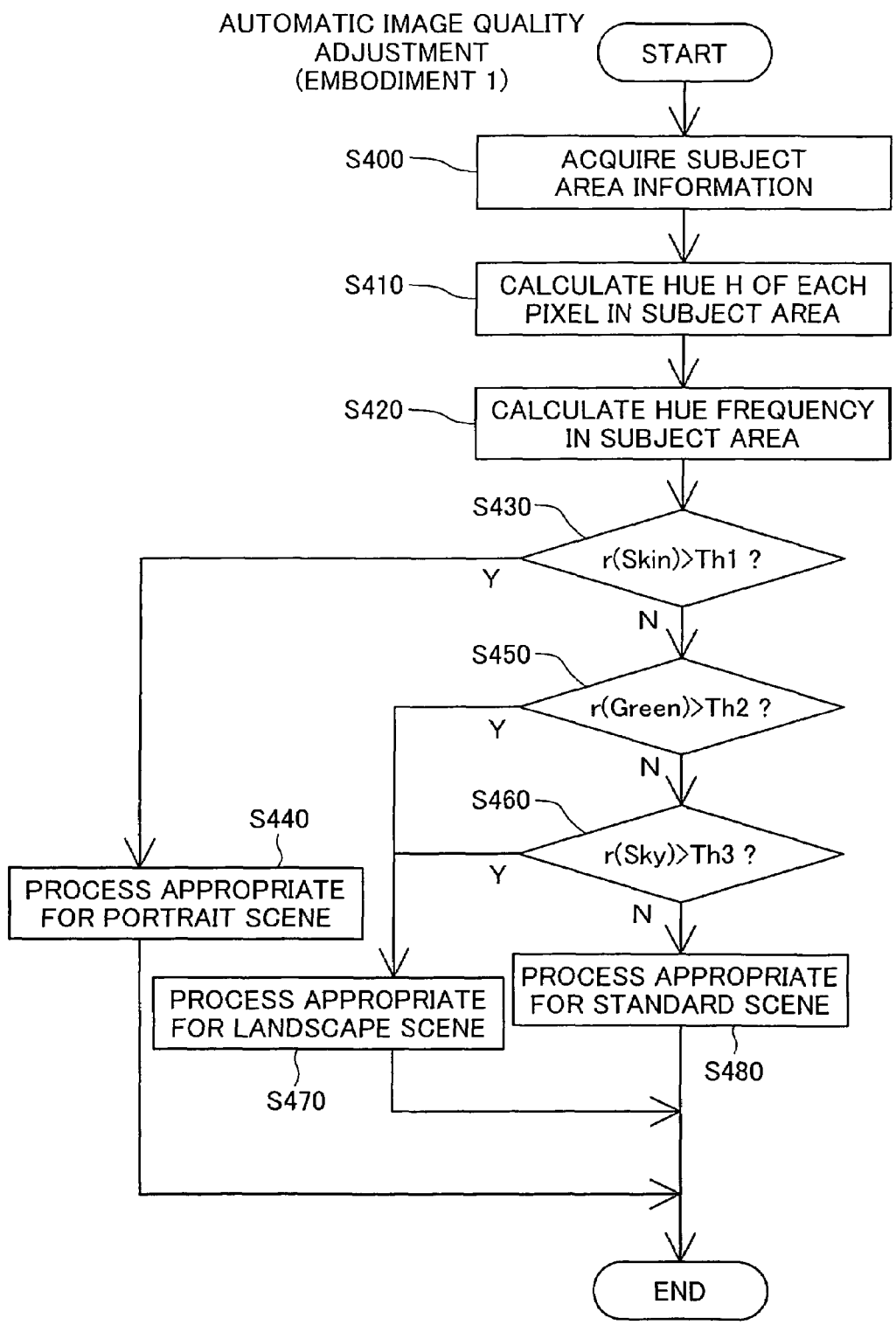
FIG. 12 is a flowchart showing a processing routine for Embodiment 1 of an automatic image quality adjustment process.

FIG. 12 is a flowchart showing a processing routine for Embodiment 1 of an automatic image quality adjustment process, corresponding to Step S340 in FIG. 11. CPU 31 (FIG. 8) analyzes the image generation record information GI and acquires subject area information (Step S400). Next, in Step S410, CPU 31 calculates the hue H of each pixel in the subject area. In this embodiment, in order to calculate hue H, a conversion from an RGB color system to an HSI (Hue, Saturation, Intensity) color system is performed. The HSI color system is preferred since hue H and intensity I are independent from each other, so that hue is unaffected by image brightness. Some other appropriate color system, such as an HSV (Hue, Saturation, Value) color system or HSL (Hue, Saturation, Luminance) color system, may be used instead.

Equations for calculating hue H in the HIS color system are now discussed. Where I=max {R, G, B} and i=min {R, G, B}, hue H will be undefined, or achromatic, when I=0; and when I≠0, they can be calculated as shown by the following equations.

$$\text{when } R = I, \quad H = \frac{\pi}{3}\left(\frac{G-B}{I-i}\right) \quad \text{[Eq. 4]}$$

$$\text{when } G = I, \quad H = \frac{\pi}{3}\left(2 + \frac{B-R}{I-i}\right)$$

$$\text{when } B = I, \quad H = \frac{\pi}{3}\left(4 + \frac{R-G}{I-i}\right)$$

However, when hue H<0, $2\pi$ is added to the calculated value for H. The value range for hue H is $0 - 2\pi$; in this embodiment, hue H is represented by a value range of 0°-360°.

Figure 13A:
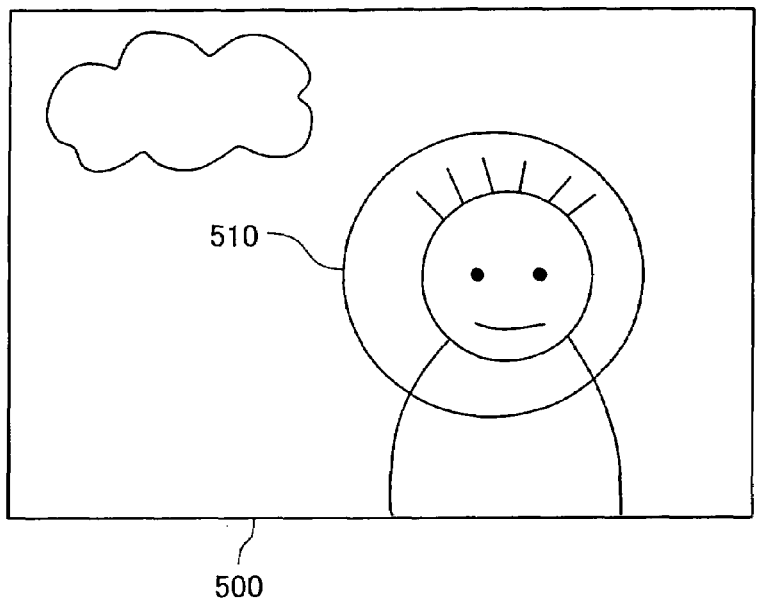
FIGS. 13(A) and 13(B) illustrate a subject area in an image in Embodiment 1, and a color histogram for pixels contained in the subject area.
Figure 13B:
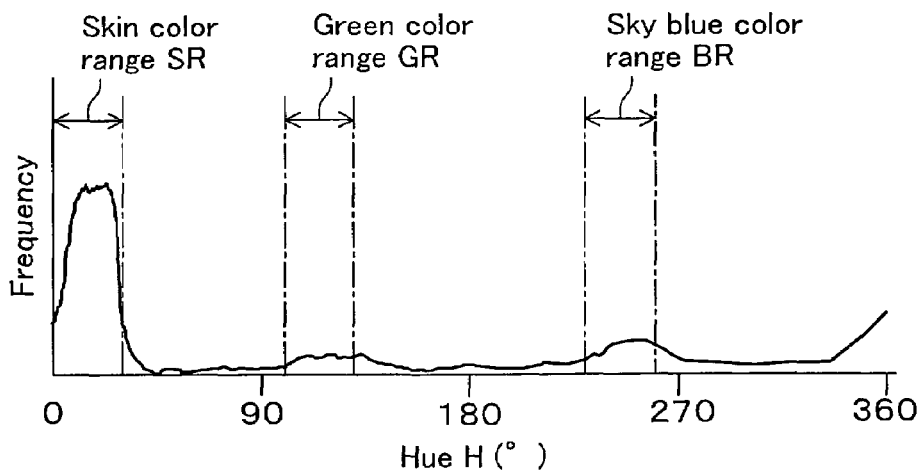

Next, for all pixels within the subject area, frequencies of pixels having hues contained respectively in the skin color, green, and sky blue color ranges are calculated (Step S420). FIGS. 13(A) and 13(B) show a subject area in an image, and a color histogram for pixels contained in the subject area. Specifically, a portrait image is shown in FIG. 13(A), and a histogram for a portrait image is shown in FIG. 13(B). In this embodiment, the hue range from 0° to 30° is designated as the skin color range SR; the range from 100° to 130° is designated as the green color range GR, and the range from 230° to 260° is designated the sky blue color range BR. Hue ranges need not necessarily be the ranges described above, and different ranges may be established instead.

Next, in Step S430, the proportion r(Skin) of skin color pixels relative to the total number of pixels in the subject area is calculated, and a decision is made as to whether this proportion r(Skin) is greater than a first threshold value Th1. In the event of a decision that r(Skin)>Th1, i.e., that the image is judged to be a portrait, the routine proceeds to Step S440 wherein processing appropriate to a portrait scene is executed, and the automatic image quality adjustment process then terminated.

If on the other hand it is not true that r(Skin)>Th1, the routine proceeds to Step S450 wherein a decision is made as to whether the proportion r(Green) of green pixels relative to the total number of pixels in the subject area is greater than a second threshold value Th2. In the event of a decision that r(Green)>Th2, i.e., that the image is judged to be a landscape containing trees or woodlands, the routine proceeds to Step S470 wherein processing appropriate to a landscape scene is executed, and the automatic image quality adjustment process then terminated.

If it is not true that r(Green)>Th2, the routine proceeds to Step S460 wherein a decision is made as to whether the proportion r(Sky) of sky blue pixels relative to the total number of pixels in the subject area is greater than a third threshold value Th3. In the event of a decision that r(Sky)>Th3, i.e., that the image is judged to be a landscape containing sky, the routine proceeds to Step S470 wherein processing appropriate to a landscape scene is executed, and the automatic image quality adjustment process then terminated; if it is not true that r(Sky)>Th3, the routine proceeds to Step S480 wherein processing appropriate to a standard scene is executed, and the automatic image quality adjustment process then terminated.

The aforementioned threshold values Th1, Th2, Th3 are preferably established so as to give a high degree of accuracy in the decisions of Steps S430, S450, and S460. It is also possible to establish predetermined values as initial values, which can then be modified by the user.

In this embodiment, processing appropriate to each scene is executed in the manner shown in FIG. 14. For example, in the event of a decision that a scene is a portrait image, contrast is set to a somewhat weaker level, lightness to a somewhat lighter level, color balance to a standard level, saturation to a somewhat lower level, and sharpness to a somewhat weaker level. Also, since skin color is indicated as a memory color, skin color correction is executed using pre-stored skin color data. Noise reduction is off. By executing image quality adjustment processing in this way, a soft ambience may be imparted to the image, and human skin tones can be adjusted to desirable skin color. However, as regards image quality adjustment, it is not necessary to follow the settings given in FIG. 14, it being possible to use different settings instead. In Embodiment 1 described hereinabove, the entire image is processed by the automatic image quality adjustment, but it is possible instead to process only the subject area. Alternatively, it is possible to process a partial area that includes the subject area.

In this Embodiment 1, a shooting scene is selected automatically for individual image data during the automatic image quality adjustment process, and the appropriate image quality processing is carried out for the image data. A resultant advantage is that there is no need for a complicated manual operation by the user when shooting or when printing.

Figure 15:
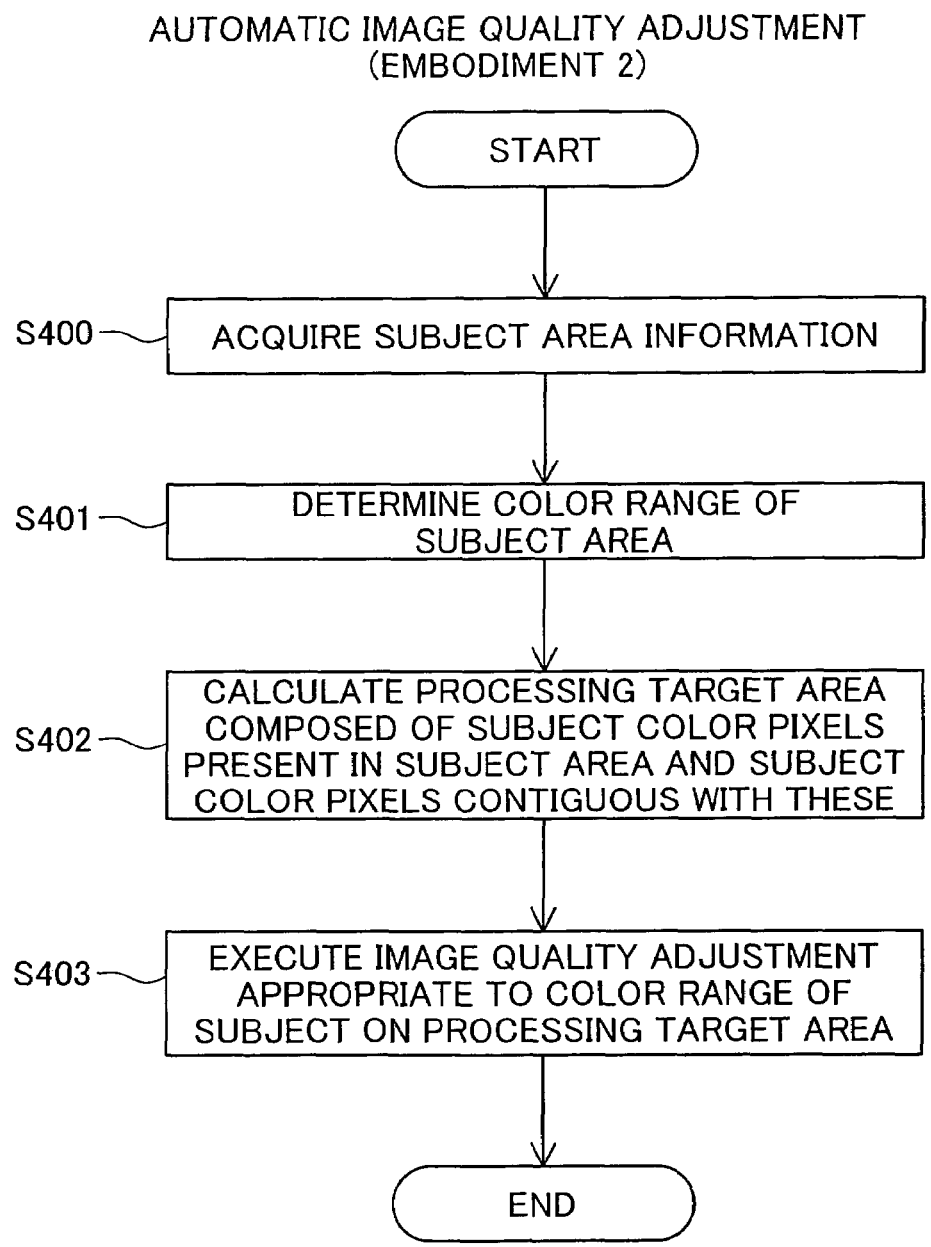
FIG. 15 is a flowchart showing a processing routine for Embodiment 2 of an automatic image quality adjustment process.
Figure 16A:
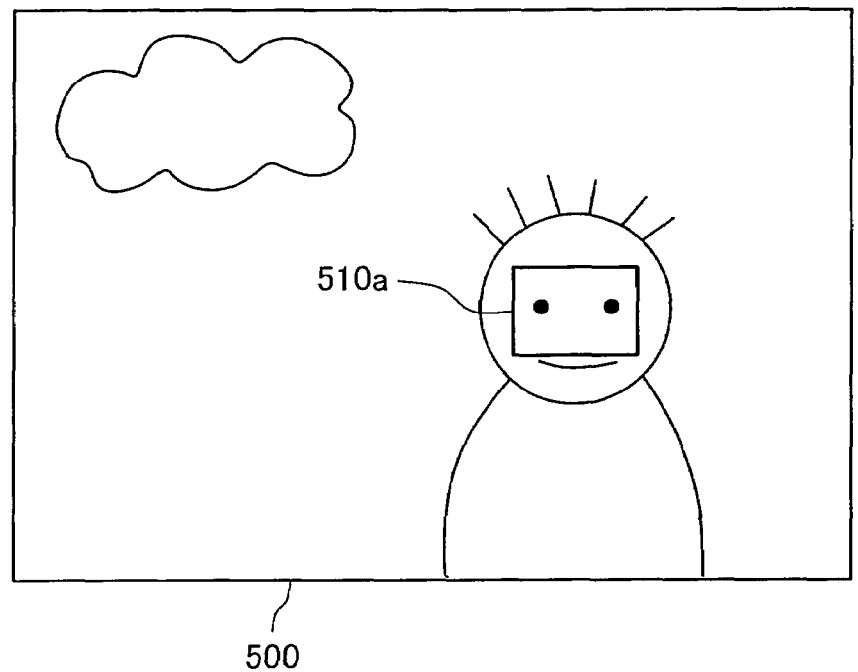
FIGS. 16(A) and 16(B) depict the processing in Embodiment 2.
Figure 16B:
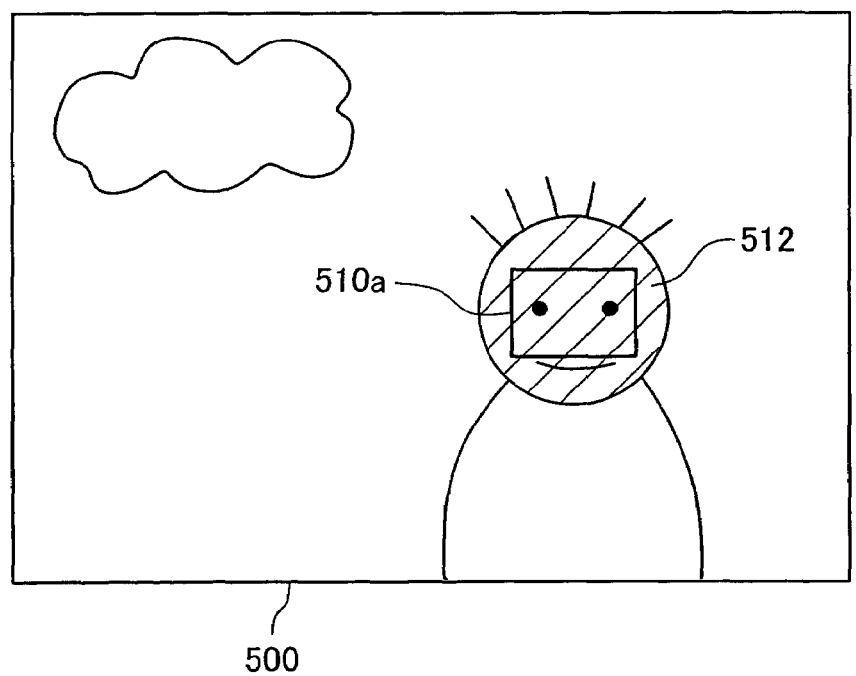

FIG. 15 is a flowchart showing a processing routine for Embodiment 2 of an automatic image quality adjustment process. FIGS. 16(A) and 16(B) depict the processing in Embodiment 2. In Step S400, as in Embodiment 1, information relating to a subject area 510a (FIG. 16(A)) is acquired from the image generation record information. In the example of FIG. 16(A), subject area 510a is rectangular. In Step S401, the color range of the subject area is determined through analysis of the color of the subject area. Here, "color range of the subject area" refers to a color range of pixels that make up the majority in the subject area (i.e., the representative color range of the subject area). As the method for calculating the subject area color range, there may be employed, for example, a method analogous to that of Embodiment 1, in which the color of each pixel is converted to the HSI color system, a histogram relating to hue H is calculated (FIG. 13(B)), and the range with the highest frequency is designated as the color range of the subject area. Alternatively, average color for the subject area may be calculated, and the color range of the subject area may be defined to be a range centered on this average color and having a predetermined width. In the example of FIG. 16(A), since the subject area 510a is established in the face of the human figure, a skin color range SR like that shown in FIG. 13(B) will be determined as the color range of the subject area. Also, the subject area color range may be one selected from among a plurality of color range candidates (e.g., skin color range SR, green color range GR, or sky blue color range SR), or a representative color range calculated from pixel colors in the actual subject area.

Hereinafter, color within the color range of a subject area will be termed "subject color" and a pixel having subject color will be termed a "subject color pixel". In Step S402, a processing target area is determined by searching for subject color pixels present within the subject area and other subject color pixels contiguous therewith but outside the subject area, and by defining the target area consisting of these subject color pixels. FIG. 16(B) shows a processing target area 512, indicated by hatching, obtained in this manner. In this example, since the color range of subject area 510a is skin color, subject area 510a is searched for pixels having skin color. Of subject color pixels present outside the subject area, those pixels that are contiguous with subject color pixels inside the subject area 510a are also extracted as pixels making up the processing target area 512. Here, "contiguous" pixels refers to pixels that are in contact in either the vertical or horizontal directions. Here, it should be noted that if the subject area 510a is set larger than the face, processing target area 512 will be smaller than subject area 510a.

The processing target area 512 may be composed of subject area color pixels exclusively; alternatively, all pixels included within the outermost contours of an area which is composed of subject area color pixels may be designated as the processing target area 512. With the former method, black eye areas present in the face, for example, will not be included in the processing target area 512, whereas with the latter method, these black eye areas may be included in the processing target area 512. An advantage of determining the processing target area 512 by means of the former method is that excessive modification of the color of pixels having color other than subject area color can be prevented. On the other hand, an advantage of determining the processing target area 512 by means of the latter method is that image quality within the processing target area 512 can be kept well-balanced even after image quality adjustment.

In Step S403, the processing target area 512 determined in the manner described above is subjected to image quality adjustment appropriate to the color range of the subject area. Specifically, where the subject color range is the skin color range, a process appropriate for a portrait scene (the process of Step S440 of FIG. 12) is executed. Where the subject color range is green or sky blue, a process appropriate for a landscape scene (the process of Step S470 of FIG. 12) is executed. Where the subject color range is some other color range, a process appropriate for a standard scene (the process of Step S480 of FIG. 12) is executed.

In this way, in Embodiment 2, the color range of a subject area is determined, and an image quality adjustment process is then executed on a processing target which is an area that includes pixels within the subject area having color within this subject color range and other pixels having subject color and contiguous therewith, whereby it is possible to perform image quality adjustment appropriate for the color range of the subject area, on only a portion of the image. In Embodiment 2 there is an additional advantage in that when, for example, a second skin tone area is contained at a location away from the subject area, image quality adjustment in proximity to the subject area can be carried out according to the color range of the subject area, without affecting the color of this second skin tone area.

G. Arrangement of Image Output System Employing Image Data Processing Device

FIG. 17 is an explanatory diagram showing an example of an image output system in which an image data processing device may be implemented by way of a embodiment of the invention. Image output system 10B comprises a digital still camera 12 as an image generating device for generating image files; a computer PC for executing image quality adjustment processing based on an image file; and a printer 20B as an image output device for outputting images. Computer PC is computer of commonly used type, and functions as an image data processing device. As the image output device, a CRT display, LCD display, or other monitor 14B, a projector, or the like may be used instead of printer 20B. In the following description, it is assumed that a printer 20B is used as the image output device. This embodiment differs from the image output system described previously (FIG. 1) in that the image data processing device comprising the image quality adjuster is independent of the image output device comprising the image output unit. The computer PC serving as the image data processing device, and the printer comprising the image output unit as a whole can be termed an "output device" in the broad sense.

An image file created in digital still camera 12 is transferred to computer PC via a cable CV, or by directly inserting into computer PC a memory card MC having the image file stored thereon. Computer PC executes image quality adjustment processing of the image data, based on the image file that has been read in. The image data produced by the image quality adjustment process is transferred to printer 20B via a cable CV, and is then output by printer 20B.

Computer PC comprises a CPU 150 that executes a program for realizing the aforementioned image quality adjustment process; RAM 151 for temporarily storing results of operations by CPU 150, image data, and the like; and a hard disk drive (HDD) 152 for storing data needed for image quality adjustment processing, such as an image quality adjustment processing program, lookup table, aperture value table, and the like. CPU 150, RAM 151, and HDD 152 function as the image quality adjuster. Computer PC further comprises a memory card slot 153 for installing a memory card MC; and an input/output terminal 154 for connecting a connector cable from digital still camera 12 or the like.

An image file GF generated by a digital still camera 12 is supplied to computer PC via a cable or via a memory card MC. When an image data processing application program, either an image retouching application or a printer driver, is run under user control, CPU 150 executes an image processing routine (FIG. 10) to process the image file GF which has been read in. Alternatively, the image data processing application program may be set to start up automatically when a memory card MC is inserted into memory card slot 153, or when connection of a digital still camera 12 to input/output terminal 154 via a cable is detected.

Image data processed by CPU 150, rather than being output in Step S250 of the image processing routine (FIG. 10), is instead transferred to an image output device, for example, printer 20B, whereupon the image output device receiving the image data executes image output.

In this embodiment, since image processing is carried out using an image quality adjuster provided to computer PC, it is possible to use an image output device that does not have an image quality adjuster. Where the image output device per se comprises an image quality adjuster, image data may be output to the image output device without being subjected to image processing on computer PC, with image processing instead being carried out by the image quality adjuster of the image output device.

As described hereinabove, in the preceding embodiments, the shooting scene can be identified automatically, and the appropriate image quality adjustment can be executed depending on this identification, whereby it is a simple matter to obtain output results of high quality.

H. Variations

The invention is not limited to the embodiments set forth hereinabove, but may be reduced to practice in various embodiments without departing from the scope and spirit thereof. The following variations are possible, for example.

H1. Variation 1

In the embodiments hereinabove, it is preferable that the automatic image quality processing is not performed if an image file GF includes shooting mode information and if the shooting mode identified prior to proceeding to the automatic image quality processing routine is a mode other than the standard scene mode. By so doing, duplication of similar image quality processing can be avoided in cases where the user has set the shooting mode manually at the time of shooting.

H2. Variation 2

In the embodiments hereinabove, the automatic image quality processing is executed on all pixels included within a subject area; however, and arrangement wherein the user can select whether to execute automatic image quality processing would also be possible.

H3. Variation 3

It is preferable that white balance is adjusted prior to executing the automatic image quality process described in FIGS. 12-16. By so doing, deviation in hue due to differences in color temperature of the light source can be corrected. This will improve the accuracy of determination in Steps S430, S450 and S460 in FIG. 12.

Figure 18:
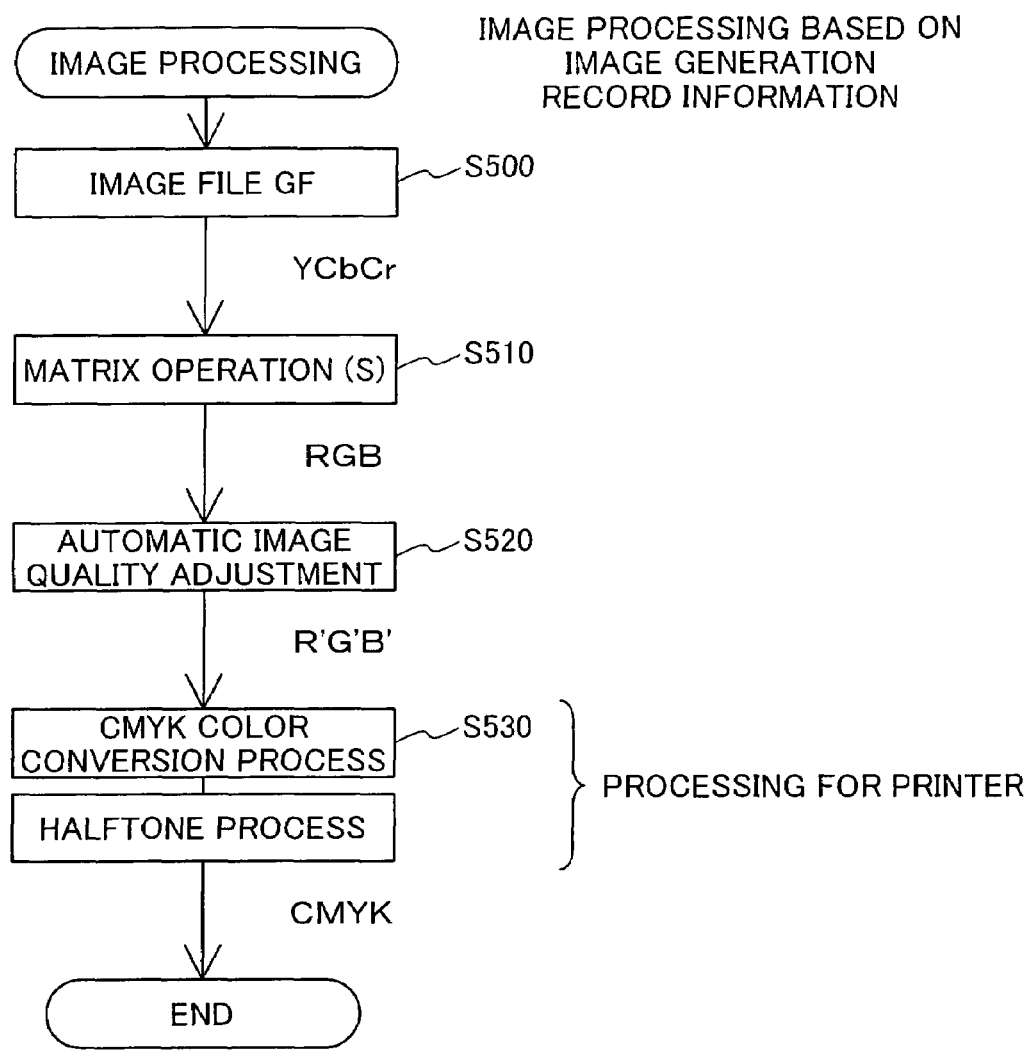
FIG. 18 is a flowchart showing an image processing routine with the color space conversion process omitted.
Figure 19:
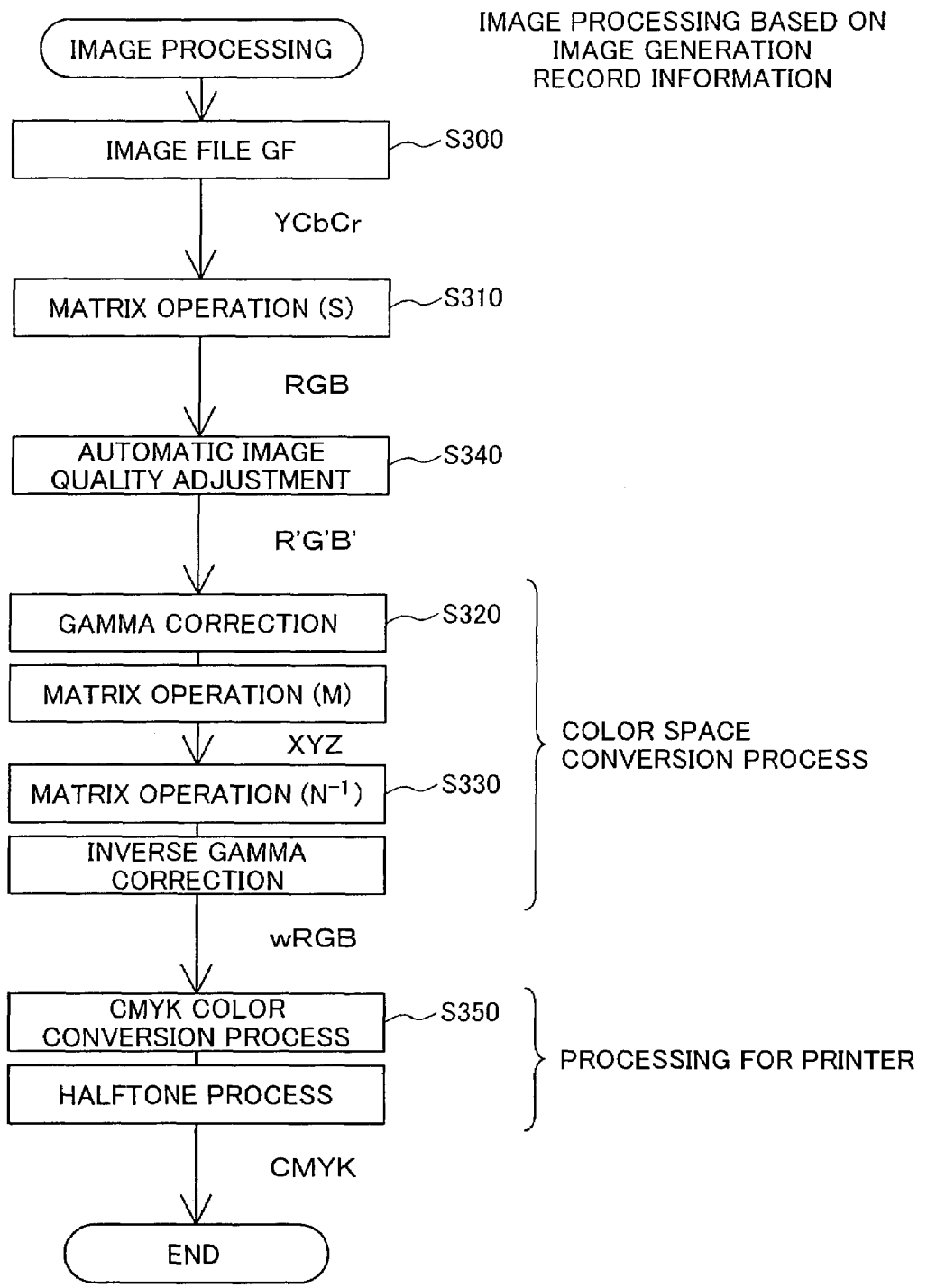
FIG. 19 is a flowchart showing another example of a processing routine for image processing based on image generation record information.
Figure 20:
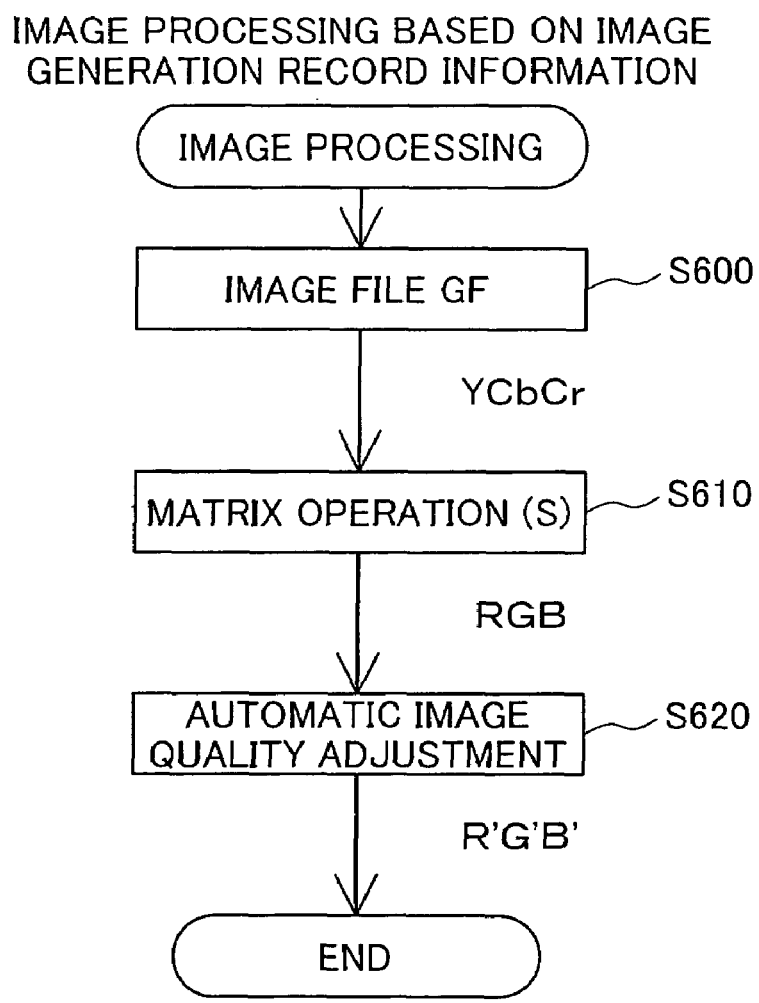
FIG. 20 is a flowchart showing another example of a processing routine for image processing based on image generation record information.

H4. Variation 4

Where an image file GF does not include image data gamma value or color space information, the color space conversion process of the image processing routine shown in FIG. 11 (Step S320 and Step S330) may be omitted. FIG. 18 is a flow chart showing an image processing routine from which the color space conversion process has been omitted. Image data acquired in Step S500 is converted from image data based on a YCbCr color space to data based on an RGB color space, in Step S510. Next, in Step S520, automatic image quality adjustment processing is executed using the image data obtained in Step S510. Next, in Step S530, a CYMK conversion process and halftone process for printing are executed.

H5. Variation 5

In the preceding embodiments, automatic image quality adjustment processing is executed after color space conversion has been executed; but instead, color space conversion (Steps S320, S330) could be executed after executing automatic image quality adjustment processing (Step S340).

H6. Variation 6

In the preceding embodiments, a printer is used as the image output unit; however, an image output unit other than a printer could be used instead. FIG. 18 is a flowchart showing a processing routine for image processing based on image generation record information, where a CRT is used as the image output unit. In contrast to the flowchart in FIG. 11, which depicts the use of a printer as the image output unit, the CYMK conversion process and halftone process for printing are omitted. Also, since a CRT can reproduce an RGB color space of image data obtained by executing a matrix operation (S), the color space conversion process is omitted as well. Where image data based on an RGB color space obtained in Step S610 includes data outside the defined area of the RGB color space, the out-of-defined-area data is clipped, and then step S620 is executed. Where the color space utilizable by an image output unit is different from an RGB color space, a color conversion process to a color space utilizable by the image output unit is executed in a manner analogous to executing the CMYK color conversion process when using a printer, and the resultant image is output by the image output unit.

H7. Variation 7

In the preceding embodiments, the description related to an Exif format file as a specific example of the image file GF; however, the format of the image file pertaining to the present invention is not limited to this, and may be of any other format. Typically, it is sufficient for the image file to include image data generated by an image generating device, and image generation record information GI describing conditions or information at the time of generation of the image data. With such a file, the image quality of image data generated by an image generating device can be appropriately adjusted automatically, for output from an output device. The subject area is not limited to the Exif format parameter described previously, and can be represented by data or parameters of various forms. For example, a parameter indicating a focus location or a focus area as a result of auto-focusing may be used. Where the user is able to indicate subject area location and shape during shooting, parameters indicating these may be used as parameters indicating a subject area.

H8. Variation 8

Values of matrices S, $N^{-1}$, and M in the equations are merely exemplary, and can be modified appropriately depending on color space on which the image file is based, the color space utilizable by the image output unit, or the like.

H9. Variation 9

In the preceding embodiments, the description relates to the use of a digital still camera 12 as the image generating device, but image files may be generated using a different image generating device, such as a scanner, digital video camera, or the like.

H10. Variation 10

In the preceding embodiments, the description takes the example of a case where image data GD and image generation record information GI are contained in the same image file GF, but image data GD and image generation record information GI need not necessarily be stored within the same file. That is, it is sufficient for image data GD and image generation record information GI to be associated with each other; for example, it is acceptable to generate associating data that associates image data GD with image generation record information GI; store one or several sets of image data and image generation record information GI in independent files; and refer to the associated image generation record information GI when processing the image data GD. This is because, in this case, although the image data GD and image generation record information GI are stored in separate files, at the point in time of image processing utilizing the image generation record information GI, the image data GD and image generation record information GI are in inseparably linked, and thus function in substantially the same way as if stored in the same file. That is, the term image file GF in the embodiment includes also a format wherein image data GD and image generation record information GI are associated, at least at the point in time that image processing takes place. Also included are motion video files stored on optical disk media such as CD-ROM, CD-R, DVD-ROM, DVD-RAM, and the like.

INDUSTRIAL APPLICABILITY

The invention is applicable to printers, digital cameras, and computers having image processing functionality.

The invention claimed is:

1. An image data processing device for processing image data, using image data generated by an image generating device, and image generation record information that is associated with the image data and that includes at least subject area information indicating a subject area in the image, the image data processing device comprising:

an image quality adjuster that calculates a hue of pixels in the subject area, and if a proportion of pixels having hue of a predetermined color range relative to all pixels within the subject area is greater than a first predetermined threshold value, executes an image quality adjustment process on the image data which is appropriate for an image containing a subject identified by the predetermined color range, wherein the image generation record information includes shooting mode information indicative of a shooting mode used in producing the image data by the image generating device, and the image quality adjuster does not execute the image quality adjustment process if the shooting mode indicated by the shooting mode information is a mode which is not a standard scene mode and which was manually set in the image generating device.

2. An image data processing device according to claim 1, further comprising an output device for outputting an image using image data generated by an image generating device, and image generation record information that is associated with the image data and that includes at least subject area information indicating a subject area in the image, the output device including an image quality adjuster that calculates a hue of each pixel in the subject area, and if a proportion of pixels having hue of a predetermined color range is greater than a first predetermined threshold value, executes an image quality adjustment process appropriate for an image containing a subject identified by the predetermined color range; and an image output unit that outputs an image according to the quality-adjusted image data.

3. An image data processing device according to claim 1, wherein the predetermined color range is a skin color range, and the image quality adjustment process is a process appropriate for a portrait image.

4. An image data processing device according to claim 3, wherein the image quality adjustment process appropriate for a portrait image is executed exclusively on a partial area that includes the subject area.

5. An image data processing device according to claim 3 or 4, wherein when the image quality adjustment process appropriate for a portrait image is not executed, and if a proportion of pixels having hue in a green range is greater than a second predetermined threshold value or if a proportion of pixels having hue in a sky blue range is greater than a third predetermined threshold value, the image quality adjuster executes an image quality adjustment process appropriate for a landscape image.

6. An image data processing device according to claim 1, wherein the image quality adjustment is executed exclusively on a target processing area which is a portion of the image and which contains pixels present within the subject area and having color of the predetermined color range.

7. An image data processing device according to claim 6, wherein the target processing area includes pixels of a first type present within the subject area and having color of the predetermined color range, and pixels of a second type present outside the subject area, but contiguous with the pixels of the first type and having color of the predetermined color range.

8. An image quality adjustment method for adjusting image quality of image data, using image data generated by an image generating device, and image generation record information that is associated with the image data and that includes at least subject area information indicating a subject area in the image, the method comprising the steps of:

calculating a hue of pixels in the subject area; and if a proportion of pixels having hue of a predetermined color range relative to all pixels within the subject area is greater than a first predetermined threshold value, executing an image quality adjustment process on the image data which is appropriate for an image containing a subject identified by the predetermined color range, wherein the image generation record information includes shooting mode information indicative of a shooting mode used in producing the image data by the image generating device, and the image quality adjuster does not execute the image quality adjustment process if the shooting mode indicated by the shooting mode information is a mode which is not a standard scene mode and which was manually set in the image generating device.

9. An image quality adjustment method according to claim 8, wherein the predetermined color range is a skin color range, and the image quality adjustment process is a process appropriate for a portrait image.

10. An image quality adjustment method according to claim 9, wherein the image quality adjustment process appropriate for a portrait image is executed exclusively on a partial area that includes the subject area.

11. An image quality adjustment method according to claim 8 or 9, wherein the step of executing an image quality adjusting process includes the step of executing an image quality adjustment process appropriate for a landscape image when the image quality adjustment process appropriate for a portrait image is not executed, and if a proportion of pixels having hue in a green range is greater than a second predetermined threshold value or if a proportion of pixels having hue in a sky blue range is greater than a third predetermined threshold value.

12. An image quality adjustment method according to claim 8, wherein the image quality adjustment is executed exclusively on a target processing area which is a portion of the image and which contains pixels present within the subject area and having color of the predetermined color range.

13. An image quality adjustment method according to claim 12, wherein the target processing area includes pixels of a first type present within the subject area and having color of the predetermined color range, and pixels of a second type present outside the subject area, but contiguous with the pixels of the first type and having color of the predetermined color range.

14. A computer-readable storage medium encoded with a computer program for causing a computer to execute processing of image data, using image data generated by an image generating device, and image generation record information that is associated with the image data and that includes at least subject area information indicating a subject area in the image, the computer program causing a computer to calculate a hue of pixels in the subject area; and if a proportion of pixels having hue of a predetermined color range relative to all pixels within the subject area is greater than a first predetermined threshold value, the computer program causing the computer to execute an image quality adjustment process on the image data which is appropriate for an image containing a subject identified by the predetermined color range, wherein the image generation record information includes shooting mode information indicative of a shooting mode used in producing the image data by the image generating device, and the image quality adjuster does not execute the image quality adjustment process if the shooting mode indicated by the shooting mode information is a mode which is not a standard scene mode and which was manually set in the image generating device.

15. An image data processing device according to claim 3, wherein the image quality adjustment process appropriate for a portrait image is a process for weakening sharpness.

* * * * *